United States Patent
Bowen et al.

(10) Patent No.: US 11,843,182 B2
(45) Date of Patent: *Dec. 12, 2023

(54) COMPUTATION WITH ADJUSTABLE RESONANT OPTICAL METAMATERIALS

(71) Applicant: Neurophos LLC, Durham, NC (US)

(72) Inventors: Patrick Bowen, Durham, NC (US); Andrew Traverso, Durham, NC (US); Daniel Marks, Durham, NC (US); David Smith, Durham, NC (US)

(*) Notice: Subject to any disclaimer, the term of this patent is extended or adjusted under 35 U.S.C. 154(b) by 179 days.

This patent is subject to a terminal disclaimer.

(21) Appl. No.: 17/474,037

(22) Filed: Sep. 13, 2021

(65) Prior Publication Data

US 2022/0004862 A1    Jan. 6, 2022

Related U.S. Application Data

(63) Continuation of application No. 17/178,942, filed on Feb. 18, 2021, now Pat. No. 11,120,332, which is a
(Continued)

(51) Int. Cl.
*H01Q 3/46* (2006.01)
*G02B 1/00* (2006.01)
(Continued)

(52) U.S. Cl.
CPC ........... *H01Q 3/46* (2013.01); *G02B 1/002* (2013.01); *G02B 3/06* (2013.01); *G06N 3/0675* (2013.01);
(Continued)

(58) Field of Classification Search
CPC ... G06N 3/04; G06N 3/08; G02B 3/06; G06K 9/58; H01Q 3/46; H01Q 15/10
See application file for complete search history.

(56) References Cited

U.S. PATENT DOCUMENTS

| 6,836,494 B1 | 12/2004 | Stuart |
| 2010/0086272 A1 | 4/2010 | Li |

(Continued)

FOREIGN PATENT DOCUMENTS

| EP | 4007888 A1 | 6/2022 |
| WO | WO2021026152 | 2/2021 |
| WO | 2022159522 A1 | 7/2022 |

OTHER PUBLICATIONS

Neurophos LLC, PCT International Patent Application No. PCT/US2022/013019, Written Opinion and International Search Report dated Apr. 27, 2022, 10 pp.
(Continued)

*Primary Examiner* — Li Wu Chang
(74) *Attorney, Agent, or Firm* — PCFB, LLC; Justin K. Flanagan

(57) ABSTRACT

Opto-electronic devices can evaluate convolutional neural networks with reduced power consumption and higher speeds using optical metamaterial structures. Methods and systems for convolution of an input vector f with a kernel k can include a first optical element that is adjustable according to the input vector f and a second optical element that is adjustable according to the kernel k, where either or both elements can include adjustable optical metasurfaces. In some approaches, the second optical element is adjustable according to a Fourier transform of the kernel k and is interposed between first and second lenses or volumetric metamaterials implementing Fourier and inverse Fourier transforms, respectively.

18 Claims, 13 Drawing Sheets

Related U.S. Application Data continuation of application No. PCT/US2020/044882, filed on Aug. 4, 2020.

(60) Provisional application No. 62/882,582, filed on Aug. 4, 2019.

(51) Int. Cl.
| | |
|---|---|
| *G02B 3/06* | (2006.01) |
| *G06N 3/067* | (2006.01) |
| *G06N 3/08* | (2023.01) |
| *G06V 10/88* | (2022.01) |
| *G06V 10/82* | (2022.01) |

(52) U.S. Cl.
CPC ............... *G06N 3/08* (2013.01); *G06V 10/82* (2022.01); *G06V 10/88* (2022.01); *G06V 10/89* (2022.01)

(56) References Cited

U.S. PATENT DOCUMENTS

| | | | |
|---|---|---|---|
| 2010/0176927 A1* | 7/2010 | Partanen | G06K 7/0008 340/10.3 |
| 2011/0188032 A1 | 8/2011 | Verma | |
| 2013/0128334 A1 | 5/2013 | Stephen | |
| 2014/0054475 A1 | 2/2014 | Khajavikhan et al. | |
| 2014/0126766 A1 | 5/2014 | Crisan et al. | |
| 2015/0255263 A1* | 9/2015 | Kodera | H01J 49/4285 250/281 |
| 2018/0262291 A1 | 9/2018 | Doster et al. | |
| 2019/0019100 A1 | 1/2019 | Roques-Carmes et al. | |
| 2019/0094408 A1 | 3/2019 | Boyarsky et al. | |
| 2019/0109379 A1 | 4/2019 | Smith | |
| 2020/0259312 A1 | 8/2020 | Mauthe et al. | |
| 2020/0303826 A1 | 9/2020 | Akselrod et al. | |
| 2021/0174186 A1 | 6/2021 | Bowen | |

OTHER PUBLICATIONS

PCT International Patent Application No. PCT/US2020/044882, Written Opinion and International Search Report dated Jan. 4, 2021, 10 pp.

Estakhri, et al., Inverse-designed metastructures that solve equations, Science 363 (6433), DOI: 10.1126/science.aaw2498, Mar. 22, 2019, pp. 1333-1338.

Weiner et al. "Ultrafast optical pulse shaping: A tutorial review," Optics Communications, 2011, pp. 3669-3692.

Yu et al., "Flat optics with designer metasurfaces," Natural Materials, 2014, pp. 139-150.

Bowen, et al., U.S. Appl. No. 17/178,942, Non-Final Office Action dated Apr. 21, 2021, 18 p.

Bowen, et al., U.S. Appl. No. 17/178,942, Notice of Allowance dated Aug. 2, 2021, 11 pp.

EP Application No. 20849361.9, European Search Report dated May 22, 2023, 9 pp.

Colburn, et al., "An Optical Frontend for a Convolutional Neural Network," Arxiv.org, Cornell University Library, Dec. 23, 2018, 13 pp.

Shaltout, et al., "Spatiotemporal Light Control with Active Metasurfaces," Science, vol. 364, No. 6441, May 17, 2019, 13 pp.

* cited by examiner $y_a$ -------- Aperture -------- $E_a(x) = \dfrac{1}{2\pi} \int E_a(k_x) e^{-ik_x x} dk_x$ $y_s$ -------- Scene -------- $E_s(x) = \dfrac{1}{2\pi} \int E_s(k_x) e^{-ik_x x} dk_x$

FIG. 8

COMPUTATION WITH ADJUSTABLE RESONANT OPTICAL METAMATERIALS

PRIORITY APPLICATIONS

This application is a continuation of U.S. patent application Ser. No. 17/178,942, titled "Computation with Optical Metamaterials," filed on Feb. 18, 2021 and issuing on Sep. 14, 2021 as U.S. Pat. No. 11,120,332, which is a continuation of Patent Cooperation Treaty Application No. PCT/US2020/044882, titled "Computation With Optical Metamaterials," filed on Aug. 4, 2020, which claims priority to United States Provisional Patent Application No. 62/882,582, titled "Opto-Electronic Accelerator for Convolutional Neural Networks Using Metamaterials," filed on Aug. 4, 2019, all of which are hereby incorporated by reference in their entireties.

TECHNICAL FIELD

This disclosure relates to opto-electronic systems for computation of forward propagation of convolutional neural networks.

BACKGROUND

Convolutional neural networks are a class of algorithms used for many applications, including object detection, object tracking, self-driving vehicle algorithms, language translation, and voice recognition. Convolutional neural networks often use intense levels of computational power to run in most practical applications, which makes them difficult to implement in mobile environments where computing resources and power are scarce. A good example is in the context of autonomous vehicles, where the power consumption of running the convolutional neural network can be up to 99% of the overall computational power consumption of the vehicle.

Five computing platforms are commonly used to implement convolutional neural networks: Central Processing Units (CPUs), Graphics Processing Units (GPUs), Field Programmable Gate Arrays (FPGAs), Application Specific Integrated Circuits (ASICs), and neuromorphic computers. Among these, CPUs and GPUs have an architecture called the Von Neumann architecture which dates back to the origins of computer history. The sheer clock speed of these processors allows them to solve some problems much faster than the human brain, but when it comes to performing other tasks, particularly tasks involving neural network algorithms like object recognition, human brains can perform them much faster and with significantly less power consumption. The difference between Von Neumann architectures and human brains is commonly attributed to the Von Neumann bottleneck. In a Von Neumann architecture, processing and memory are physically separated, which means that data should be constantly shuffled back and forth between the two, and the bus that provides the link is a bottleneck on the computational speed and efficiency. In contrast to Von Neumann architectures, neuromorphic computers are architectures that physically function in a similar manner to a brain. In this case, the memory of the algorithm is embedded in the connections between each neuron, which is also where processing takes place. In that sense, processing and memory are co-located, and there is no lag due to data transfer between these two.

ASICs and FPGAs can be thought of as alternatives to Von Neumann architectures, and they both excel at reducing the power consumption and processing time of convolutional neural networks. However, it has been recognized since the 1980s that analog, optical neuromorphic computers could have another significant advantage over digital electronic approaches. For a digital computer, performing a convolution is an $O(N^2)$ operation for an input vector of length N, which is the most computationally expensive operation within a convolutional neural network algorithm. However, for an optical neuromorphic computer, the primary power requirement is often the power used to generate the input light, which scales as $O(N)$. This difference means a dramatic reduction in the energy used to implement the algorithm, so much so that it is possible for an optical computer to break the Landauer limit on digital computation for inputs of sufficiently large N. Moreover, not only can optical neuromorphic computers reduce computational power, the time needed for an optical neuromorphic computer to evaluate a convolution is simply the transit time of the light from one end of the device to the other, which is virtually instantaneous relative to the computational time needed by conventional modern digital electronic approaches.

Recently, the increased demand for deep learning and convolutional neural networks has inspired several groups to revisit the topic of optical neuromorphic computing. Some have used Mach-Zehnder interferometers to perform linear operations on light travelling through an array of silicon nanophotonic waveguides. However, Mach-Zehnder interferometers are typically both bulky and power hungry, and these architectures often require $O(N^2)$ interferometers to implement a convolution, which eliminates the optical computing advantage over digital approaches. Another proposed architecture is to use electro-optic modulators to encode both the input signal and the various rows of the linear operator in the time domain, interfere them using a beam splitter, and then perform a multiply-add operation using an array of photodetectors. However, this approach requires $O(N^2)$ modulations of the light source to optically encode both the input vector and the linear operator before sending them to the beam splitter, which again eliminates the advantage of using optical computing. Another proposed approach is to use frequency division multiplexing in a waveguide loop to address many neurons simultaneously. However, this approach can severely limit the number of inputs by the bandwidth of the waveguide and the linewidth of the laser, which does not allow for operation on larger input vectors where optical computing excels.

One approach to optical computing that has been recently revisited which may use $O(N)$ energy consumption is an approach called an optical correlator, or "4f" system. Typically, a 4f system uses a lens to implement a Fourier transform, an optical diffractive screen to effectively multiply the output by the Fourier transform of the kernel, and a second lens to take the inverse Fourier transform. It is referred to as a 4f system because it requires four focal lengths of optical path, since the input image is placed at the focal plane of the first lens, the screen at the focal plane between the two lenses, and the detector array at the final focal plane of the second lens. However, existing 4f systems do not provide a way to reconfigure the diffractive optical screen such that different kernels may be used.

SUMMARY

This specification describes methods and systems that employ optical metamaterials to perform the computation of a convolution of a given input vector with a given kernel.

The optical metamaterials can be used together with a photoelectric detector array, nonlinear electronic circuitry, and a feedback loop structure to compute a plurality of layers of a convolutional neural network.

In general, a first innovative aspect of the subject matter described in this specification can be embodied in methods of optical computation of a convolution that include: selecting an input vector f and a kernel k for convolution with the input vector; illuminating a first adjustable optical element with optical radiation comprising a feed wave, the first adjustable optical element being configured to transform the feed wave into a first wave corresponding to the input vector f; refracting optical radiation comprising the first wave with a first refractive optic to transform the first wave to a second wave corresponding to a Fourier transform F of the input vector f; illuminating a second adjustable optical element with optical radiation comprising the second wave, the second adjustable optical element being configured to transform the second wave to a third wave corresponding to a kernel multiplication G=KF in Fourier space, where K is a Fourier transform of the kernel k; refracting optical radiation comprising the third wave with a second refractive optic to provide a fourth wave corresponding to an inverse Fourier transform g of the kernel multiplication KF; and detecting optical radiation comprising the fourth wave with a detector array; wherein at least one of the first and second adjustable optical elements includes an optical metasurface.

In some approaches, the first refractive optic can include a Fourier lens or a volumetric metamaterial. The volumetric metamaterial can include a volumetric array of optical dipole elements spaced apart by substantially less than one-half of a wavelength of the optical radiation. The optical dipole elements can have polarizabilities that are numerically optimized to convert a set of input fields corresponding to eigenfunctions of a Fourier transformation operator into a set of respective output fields corresponding to the eigenfunctions multiplied by respective eigenvalues. The numerically optimized polarizabilities can correspond to physical parameters of the optical dipole elements. The physical parameters of the optical elements can include geometries, resonant frequencies, or Q-factors of the optical dipole elements.

In some approaches, the second refractive optic can include a Fourier lens or a volumetric metamaterial. The volumetric metamaterial can include a volumetric array of optical dipole elements spaced apart by substantially less than one-half of a wavelength of the optical radiation. The optical dipole elements can have polarizabilities that are numerically optimized to convert a set of input fields corresponding to eigenfunctions of an inverse Fourier transformation operator into a set of respective output fields corresponding to the eigenfunctions multiplied by respective eigenvalues. The numerically optimized polarizabilities can correspond to physical parameters of the optical dipole elements. The physical parameters of the optical elements can include geometries, resonant frequencies, or Q-factors of the optical dipole elements.

In some approaches, the first optical element can include a spatial light modulator or an optical metasurface. The optical metasurface can include an array of optical radiation scatterers spaced apart by substantially less than one-half of a wavelength of the optical radiation, where the first adjustable optical element is configured to transform the feed wave to the first wave by individually adjusting scattering properties of the optical radiation scatterers. The individually adjusting of the scattering properties can include individually adjusting resonant frequencies of the optical radiation scatterers. The individually adjusting of the scattering properties can include individually adjusting of Q-factors of the optical radiation scatterers. The optical radiation scatterers can include voltage-tunable optical radiation scatterers, where the individually adjusting of the scattering properties includes individually adjusting control voltages of the optical radiation scatterers.

In some approaches, the second optical element can include a spatial light modulator or an optical metasurface. The optical metasurface can include an array of optical radiation scatterers spaced apart by substantially less than one-half of a wavelength of the optical radiation, where the second adjustable optical element is configured to transform the second wave to the third wave by individually adjusting scattering properties of the optical radiation scatterers. The individually adjusting of the scattering properties can include individually adjusting resonant frequencies of the optical radiation scatterers. The individually adjusting of the scattering properties can include individually adjusting of Q-factors of the optical radiation scatterers. The optical radiation scatterers can include voltage-tunable optical radiation scatterers, where the individually adjusting of the scattering properties includes individually adjusting control voltages of the optical radiation scatterers.

In some approaches, the selected input vector f is an input vector for a layer of a convolutional neural network, and the methods further include: based on the detected optical radiation corresponding to convolution of the input vector f with the kernel k, updating one or both of the input vector f and the kernel k for a next layer of the convolutional neural network; and after the updating, repeating the illuminating of the first adjustable optical element, the refracting with the first refractive optic, the illuminating of the second adjustable optical element, the refracting with the second refractive optic, and the detecting with the detector array.

A second innovative aspect of the subject matter described in this specification can be embodied in systems for optically calculating a convolution of an input vector f with a kernel k, where the systems include: a coherent optical source; a first optical element positioned to receive optical radiation comprising a feed wave from the coherent optical source and adjustable responsive to first control inputs to transmit a first wave corresponding to the input vector f; a first refractive optic positioned to receive the first wave and transmit a second wave corresponding to a Fourier transform F of the input vector f; a second optical element positioned to receive the second wave and adjustable responsive to second control inputs to transmit a third wave corresponding to a kernel multiplication G=KF in Fourier space, where K is a Fourier transform of the kernel k; a second refractive optic positioned to receive the third wave and transmit a fourth wave corresponding to an inverse Fourier transform g of the kernel multiplication KF; and a detector array positioned to receive the fourth wave; wherein at least one of the first and second optical elements comprises an optical metasurface.

In some approaches, the first refractive optic can include a Fourier lens or a volumetric metamaterial. The volumetric metamaterial can include a volumetric array of optical dipole elements spaced apart by substantially less than one-half of a wavelength of the optical radiation. The optical dipole elements can have polarizabilities that are numerically optimized to convert a set of input fields corresponding to eigenfunctions of a Fourier transformation operator into a set of respective output fields corresponding to the eigenfunctions multiplied by respective eigenvalues. The numerically optimized polarizabilities can correspond to physical parameters of the optical dipole elements. The physical parameters of the optical elements can include geometries, resonant frequencies, or Q-factors of the optical dipole elements.

In some approaches, the second refractive optic can include a Fourier lens or a volumetric metamaterial. The volumetric metamaterial can include a volumetric array of optical dipole elements spaced apart by substantially less than one-half of a wavelength of the optical radiation. The optical dipole elements can have polarizabilities that are numerically optimized to convert a set of input fields corresponding to eigenfunctions of an inverse Fourier transformation operator into a set of respective output fields corresponding to the eigenfunctions multiplied by respective eigenvalues. The numerically optimized polarizabilities can correspond to physical parameters of the optical dipole elements. The physical parameters of the optical elements can include geometries, resonant frequencies, or Q-factors of the optical dipole elements.

In some approaches, the first optical element includes a spatial light modular or an optical metasurface. The optical metasurface can include an array of optical radiation scatterers spaced apart by substantially less than one-half of a wavelength of the optical radiation, where the first control inputs are control inputs for individually adjusting scattering properties of the optical radiation scatterers. The optical radiation scatterers can include voltage-tunable optical radiation scatterers, where the first control inputs include voltage control inputs for the optical radiation scatterers.

In some approaches, the second optical element includes a spatial light modulator or an optical metasurface. The optical metasurface can include an array of optical radiation scatterers spaced apart by substantially less than one-half of a wavelength of the optical radiation, where the second control inputs are control inputs for individually adjusting scattering properties of the optical radiation scatterers. The optical radiation scatterers can include voltage-tunable optical radiation scatterers, where the second control inputs include voltage control inputs for the optical radiation scatterers.

A third innovative aspect of the subject matter described in this specification can be embodied in methods that include: identifying a set of input fields and a corresponding set of output fields; and numerically optimizing polarizabilities for a volumetric array of optical dipole elements comprising a metamaterial that converts the set of input fields to the corresponding set of output fields.

In some approaches, the volumetric array of optical dipole elements includes a volumetric array of optical dipole elements spaced apart by substantially less than one-half of a wavelength of the optical radiation.

In some approaches, the input fields correspond to eigenfunctions of a Fourier transformation or inverse Fourier transformation operator and the output fields correspond to the eigenfunctions multiplied by respective eigenvalues. In other approaches, the input fields correspond to plane waves and the output fields correspond to the plane waves multiplied by corresponding Fourier amplitudes of a selected convolution kernel.

In some approaches, the physical parameters of the optical elements can include geometries, resonant frequencies, or Q-factors of the optical dipole elements. The methods can further include fabricating the metamaterial according to the physical parameters that correspond to the numerically optimized polarizabilities. Further embodiments are apparatuses that include metamaterials fabricated according to the physical parameters that correspond to the numerically optimized polarizabilities.

Various features and advantages of the foregoing subject matter are described below with respect to the figures. Additional features and advantages are apparent from the subject matter described herein and the claims.

BRIEF DESCRIPTION OF THE DRAWINGS

FIG. 8 shows an optical device that uses a volumetric metamaterial fabricated according to a symphotic algorithm to perform a kernel convolution.

Like reference numbers and designations in the various drawings indicate like elements.

DETAILED DESCRIPTION

A. System Architecture

This disclosure presents an opto-electronic device that can evaluate convolutional neural networks with reduced power consumption and higher speeds using an optical metamaterial structure. In some approaches, a metamaterial provides a collection of electromagnetic wave scatterers, where each of the scatterers is sufficiently subwavelength in size such that it primarily scatters electromagnetic waves as a dipole. The scatterers may be referred to as metamaterial elements, which may be either resonant or non-resonant. The elements may, for a dynamic metamaterial, be connected to a tuning mechanism which adjusts the polarizability and/or scattering of the element. For example, each metamaterial element may include a material with adjustable dielectric properties, such as a liquid crystal material or a ferroelectric material, and the metamaterial element may be adjustable by applying a bias voltage that changes a dielectric constant of the adjustable material. Metamaterial elements may be subwavelength scatterers in all three dimensions, or subwavelength in two dimensions, such that it scatters like a line source. Alternatively, one may consider a metamaterial element to be in the shape of a loop which is subwavelength in dimension of the minor axis of the loop so that it scatters like a current loop. Regardless of the dimensionality of the scatterers, a metamaterial can provide a collection of subwavelength scatterers, where the distance between the scatterers is less than half a wavelength. For example, the distance between the scatterers can be less than or equal to one-third, one-fifth, or one-tenth of an operating wavelength of the device.

Figure 1A:
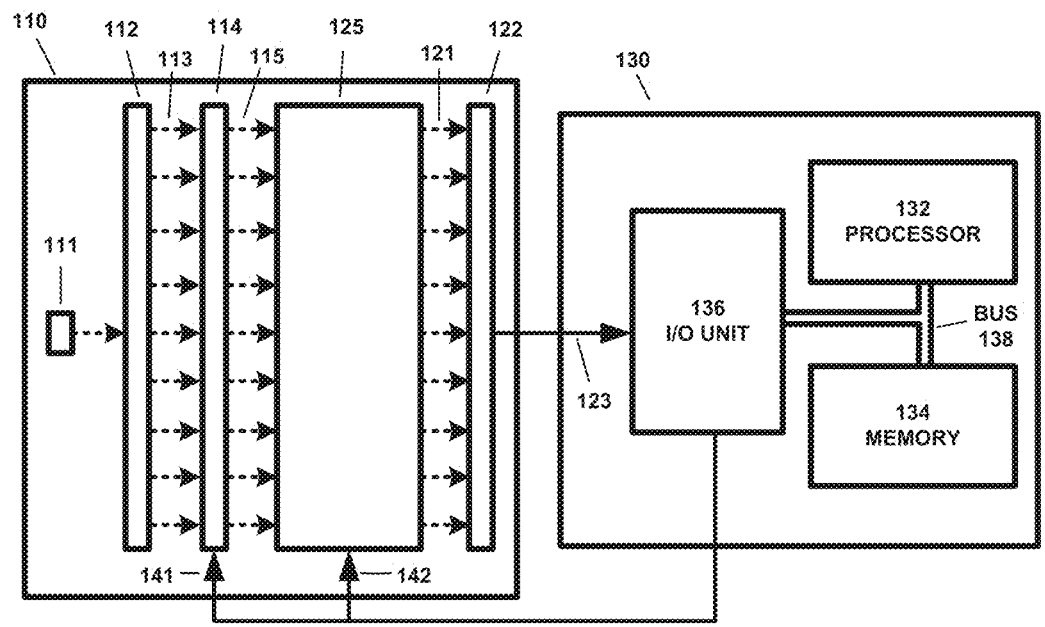
FIGS. 1A-1B show block diagrams of an exemplary opto-electronic computer.
Figure 1B:
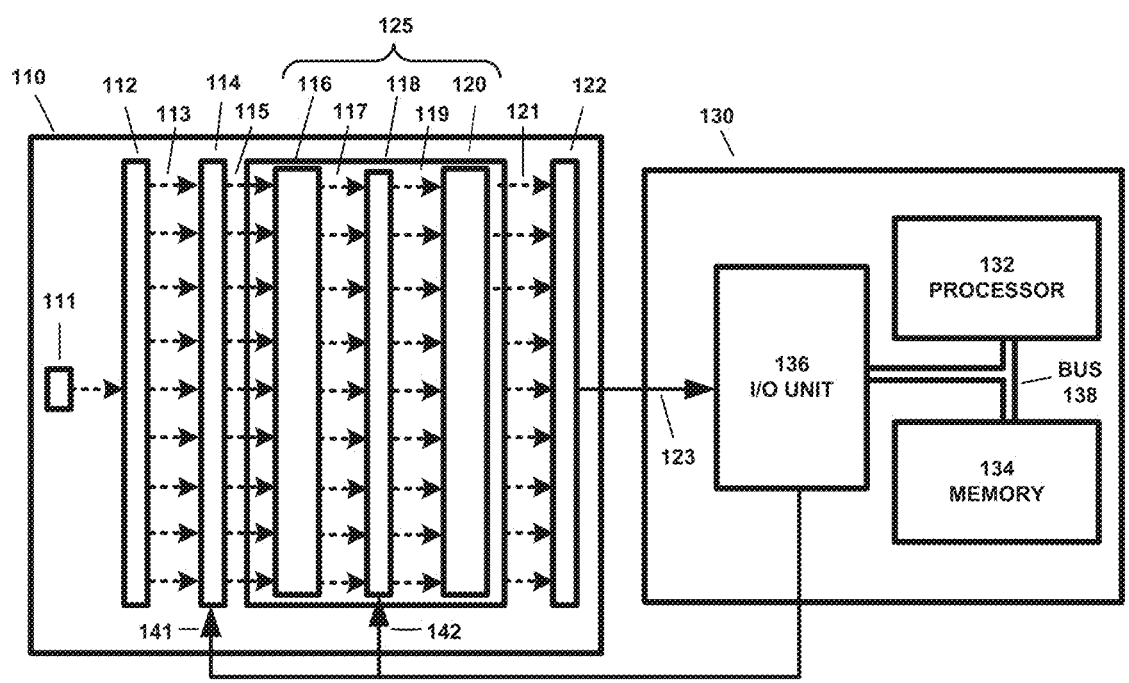

An illustrative embodiment is depicted as a system block diagram in FIGS. 1A-1B. The opto-electronic system can include an optical subsystem 110 and an electronic subsystem 130. A coherent light source 111, such as a laser, is sent into a feed structure 112 that spreads an incident beam across a surface of a first adjustable optical element 114. For example, the feed structure 112 can include a diverging lens structure that causes the laser to illuminate a surface of the first optical element 114, or the feed structure 112 can include one or more dielectric waveguides that distribute a light along the surface of the first optical element 114.

Figure 1C:
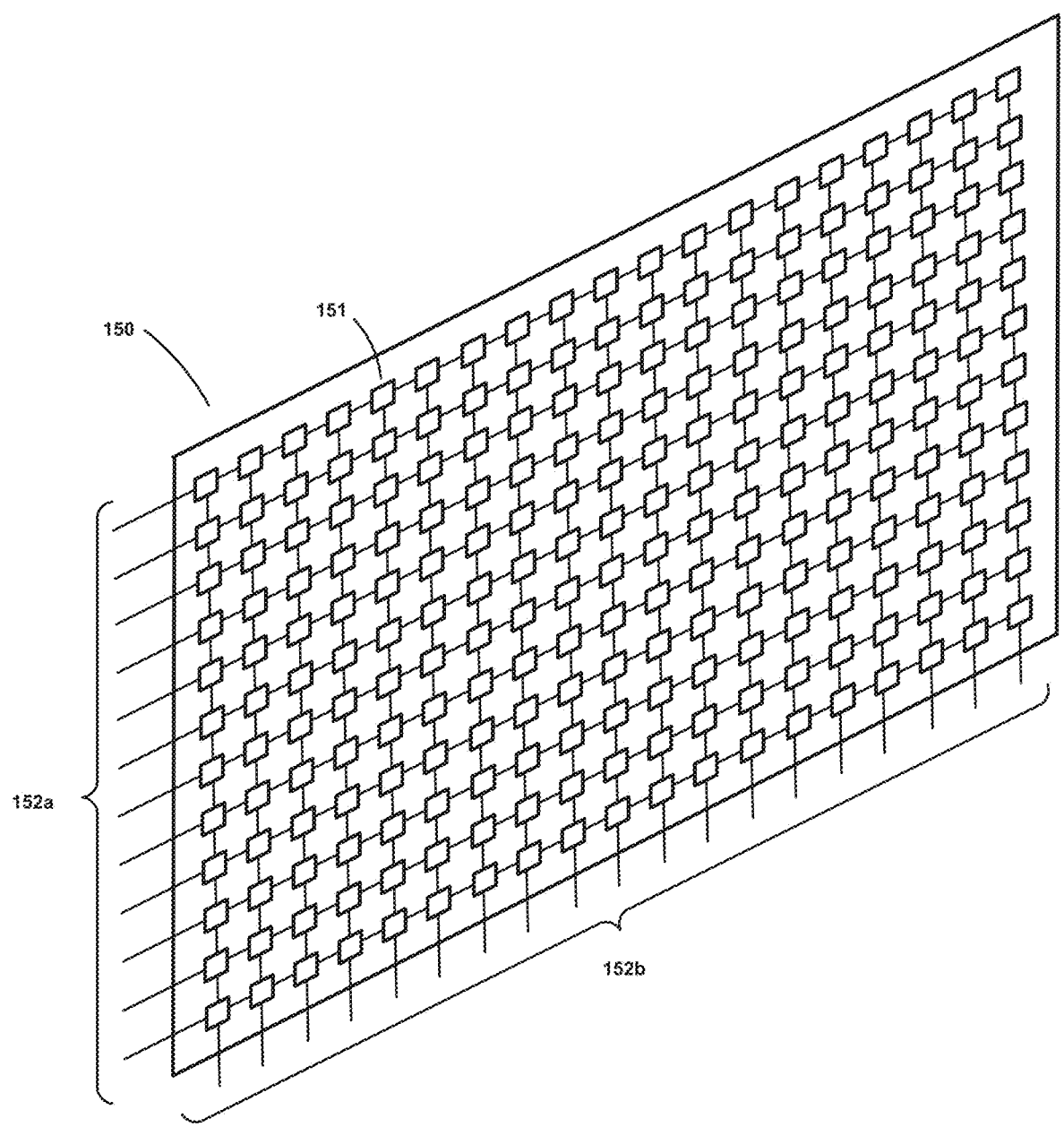
FIG. 1C shows an example of an adjustable optical metasurface.

The first optical element 114 can include of a set of scatterers that are controlled by a tuning mechanism so that their scattering properties can be dynamically controlled. An input vector, or input image f(x,y), is then used as the control signal of the tuning mechanism of the scatterers on a surface, such that each scatterer's polarizability or tuning state is adjusted to take a complex value of a particular component of the input vector. The scattering elements themselves may be implemented with either a metasurface with dynamically tunable elements, or a spatial light modulator. By Love's equivalence theorem, the scattering from the surface may be considered a magnetic and/or electric current, where the distribution of the current on the surface is given by the input vector. An illustrative example of the first optical element 114 is depicted as optical metasurface 150 of FIG. 1C. The optical metasurface 150 features an array of subwavelength elements 151 (in this example, the array is a rectangular array, but other arrangements are possible), and the elements are individually adjustable with control inputs 152a, 152b. In this example, the individual elements are matrix-addressable with row control inputs 152a and column control 152b, but in other approaches, the individual elements are directly addressed with individual control inputs. By adjusting the control inputs 152a, 152b, the optical metasurface 150 can respond to an input feed wave 113 to produce a first wave 115 that corresponds to the selected input vector f(x,y). In one approach, each subwavelength element 151 of the optical metasurface 150 can include a subwavelength structure that includes a voltage-adjustable material such as a liquid crystal or ferroelectric material, so that the scattering properties (such as polarizability, resonant frequency, Q-factor, etc.) can be adjusted by applying an adjustable bias voltage to each optical element. For example, each metamaterial element can include a pair of metallic or dielectric rods or pillars separated by a gap; a voltage-adjustable material such as a liquid crystal or ferroelectric material can be interposed within the gap; and bias voltage lines can be coupled to the rods or pillars to apply a voltage difference across the gap and thereby tune the scattering properties of the metamaterial element.

Regardless of the implementation of the scattering surface, a volumetric metamaterial 125 can be placed in an optical path after the metasurface which is configured to perform a convolution on the first wave 115 that is generated by the metasurface. This volumetric metamaterial 125 can be designed using a "symphotic algorithm," as further discussed below, which is a variational approach to computing the required polarizabilities of each metamaterial element in the volume in order for the volumetric metamaterial 125 to implement a specific function. Thus, this volumetric metamaterial 125, through the symphotic algorithm, can perform a convolution of the field 115 emitted by the metasurface or spatial light modulator 114 with a desired kernel. This can be done with at least two approaches. In a first approach, as illustrated in FIG. 1A, the entire volume of the volumetric metamaterial 125 is dynamically tunable, and the volumetric metamaterial 125 is tuned such that the scattering that results from the volume corresponds to the result of the convolution of the input vector by the kernel.

Figure 2B:
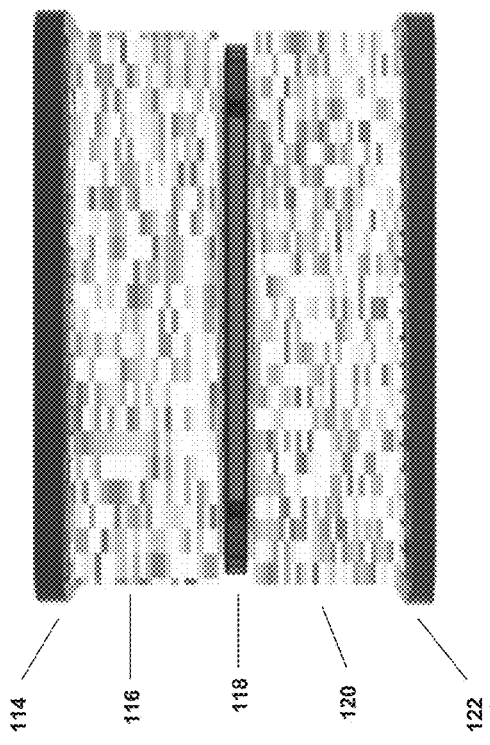
FIGS. 2A and 2B show exploded and assembled views of an exemplary optical portion of an opto-electronic computer.

In a second approach, as illustrated in FIG. 2B, the volume of volumetric metamaterial 125 is split into three sections: two disparate metamaterial volumes 116 and 120 separated by a spatial light modulator or metasurface 118. The two volumes 116 and 120 can be static metamaterial volumes, while the intervening spatial light modulator or metasurface 118 can be dynamically reconfigurable. For example, the optical element 118 can be an optical metasurface such as that depicted as the optical metasurface 150 in FIG. 1C. The first volume 116 is designed to output the Fourier transform 117 of the input field 115, which is then scattered onto the optical metasurface 150 in FIG. 1C. The spatial light modulator or metasurface 118 is configured such that the output 119 of the metasurface is the multiplication of the incident field with the Fourier transform of the kernel. The second volumetric metamaterial 120 is designed to scatter such that the output field 121 is the inverse Fourier transform of the input field. By the convolution theorem, the final resulting scattered field will be the convolution of the input vector with the kernel. This is ultimately because plane waves are the eigenbasis of the convolution operator, and taking the Fourier transform applies a linear transformation to the input field such that it is now in that basis. In some approaches, one or both of the first volumetric metamaterial 116 and the second volumetric metamaterial 120 can be replaced with conventional Fourier optical lenses implementing the Fourier and inverse Fourier transforms, respectively.

The final output wave 121 from the optical convolution can be received by a detector array 122, which then delivers a detector signal 123 to the electronic subsystem 130 of the opto-electronic device. The electronic subsystem 130 can include, for example, one or more digital processors 132, one or more memory units 134, and one or more I/O units 136 connected together by a bus 138. The I/O unit 136 can include A/D converters for converting input voltage signals 123 from the optical detector array 122 into digital signals for further processing by the electronic subsystem 130. The I/O unit 136 can output first control signals 141 for adjusting the first optical element 114 to provide the input vector f(x,y); for example, if the first optical element 114 includes voltage-adjustable elements, the I/O unit 136 can include D/A converters to output first voltage control signals 141 for the first optical element 114. The I/O unit 136 can also output second control signals 142 for adjusting either the second adjustable optical element (either the volumetric metamaterial 125 or the surface metamaterial or spatial light modulator 118) to provide the selected kernel k(x,y) for convolution with the selected input vector f(x,y); for example, if the second adjustable optical element (125 or 118) includes voltage-adjustable elements, the I/O unit 136 can include D/A converters to output second voltage control signals 142 for the second adjustable optical element (125 or 118).

The electronic subsystem 130 can be programmed with a convolutional neural network algorithm to adjust the first and second output control signals 141 and 142 to cause the optical subsystem 110 to carry out convolution calculations of the convolutional neural network algorithm. For example, the electronic subsystem 130 can iterate the input vectors f(x,y) and/or the kernels(x,y) for successive kernel convolution calculations, e.g., using max pooling and/or rectifier linear units, to iterate the input vectors f(x,y) and the kernels(x,y) for successive layers of a convolutional neural network.

Figure 2C:
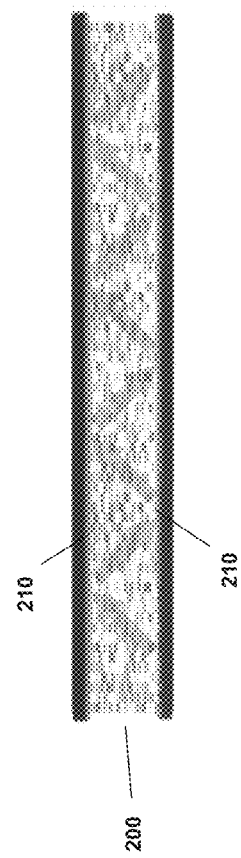
FIG. 2C shows an example of a volumetric metamaterial that is subtended by reflective elements to allow for multiple optical path-lengths through the metamaterial.
Figure 2A:
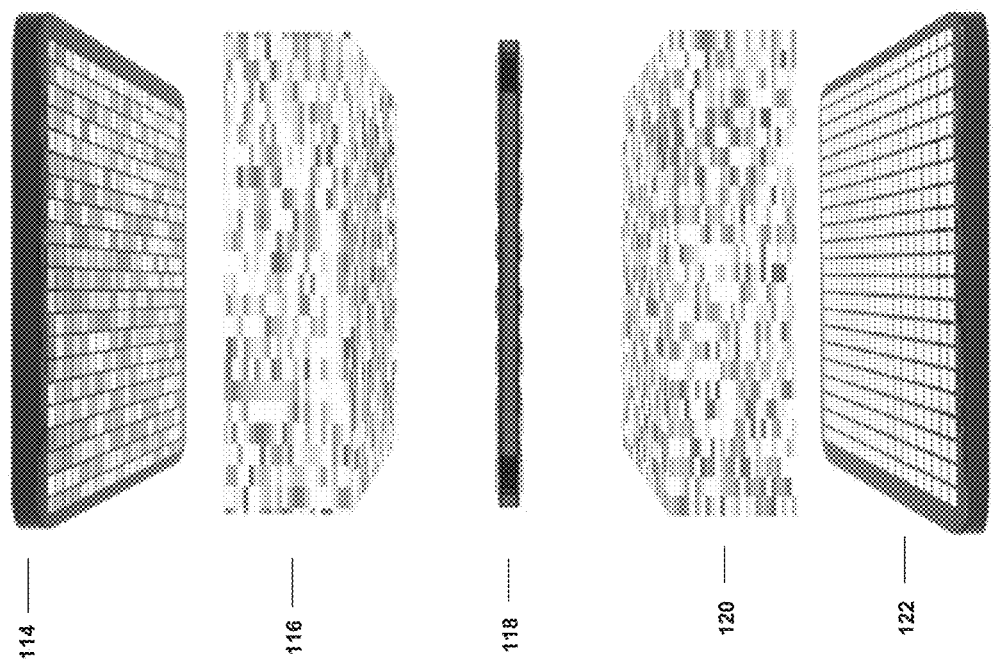

With reference now to FIGS. 2A-2C an illustrative arrangement of the elements in the optical subsystem 110 of FIG. 1B is depicted, as an exploded view in FIG. 2A and as an assembled view in FIG. 2B. It should be noted, as illustrated in FIG. 2C, that a volumetric metamaterial 200 (e.g., the volumetric metamaterial 125 in FIG. 1A, or either or both volumetric metamaterials 116 and 120 in FIG. 2B) can be implemented with either a transmissive or reflective geometry where, for a reflective configuration, the volumetric metamaterials 200 are subtended by simple reflective elements 210. This can allow for flexibility in fabrication and on-chip implementation without changing the inherent function of the device.

Figure 3:
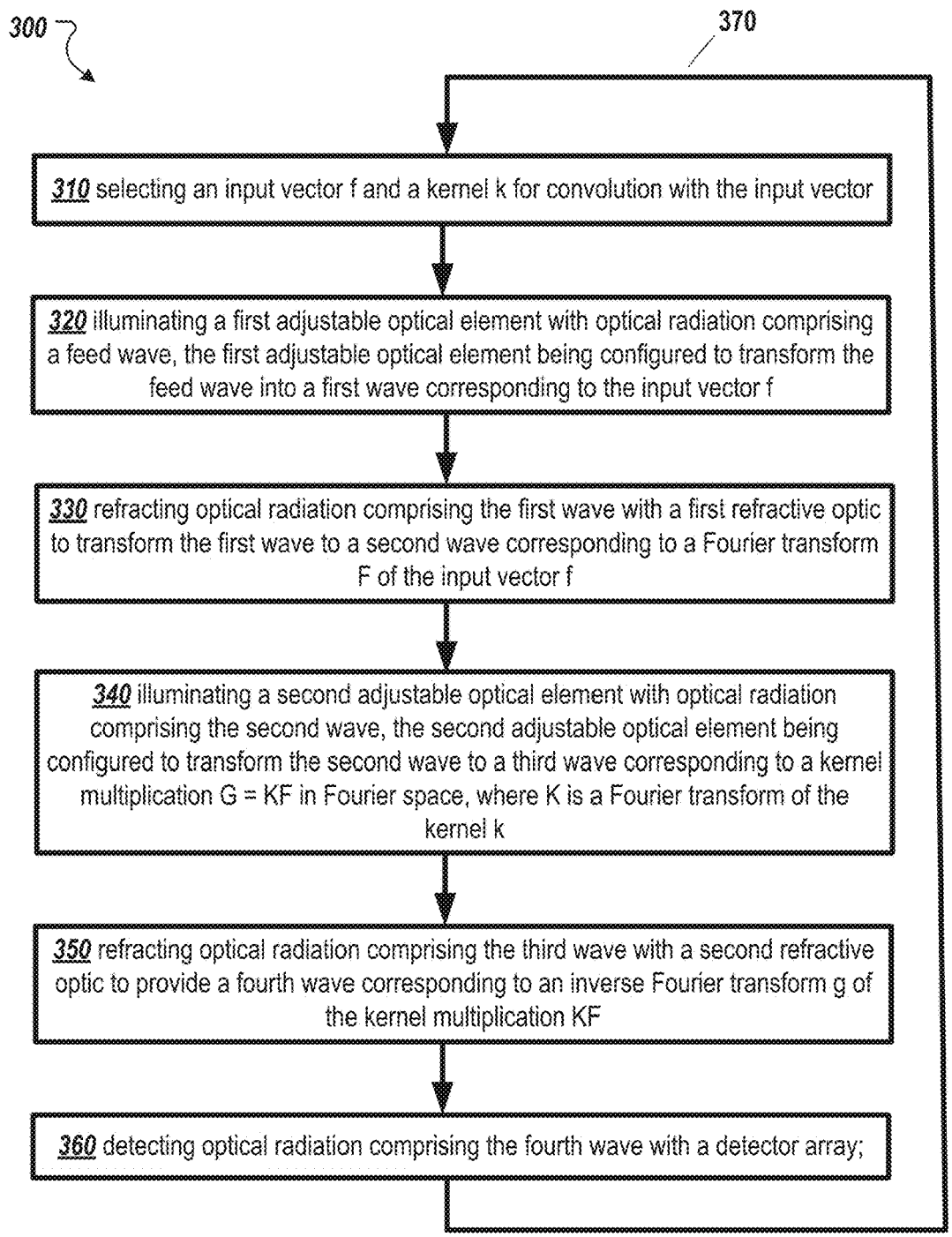
FIG. 3. is a flow diagram of a method of optical computation.

With reference now to FIG. 3, an illustrative embodiment is depicted as a process flow diagram. The process 300 includes 310—selecting an input vector f and a kernel k for convolution with the input vector. The process further includes 320—illuminating a first adjustable optical element with optical radiation comprising a feed wave, the first adjustable optical element being configured to transform the feed wave into the first wave 115 of FIG. 1A corresponding to the input vector f. For example, the first control inputs 141 for the first optical element 114 in FIG. 1A or 1B can be adjusted so that the first optical element 114 responds to the feed wave 113 to produce the first wave 115. The process further includes 330—refracting optical radiation comprising the first wave with a first refractive optic to transform the first wave to a second wave corresponding to a Fourier transform F of the input vector f. For example, the first volumetric metamaterial 116 in FIG. 1B can receive the first wave 115 and transmit the second wave 117. The process further includes 340—illuminating a second adjustable optical element with optical radiation comprising the second wave, the second adjustable optical element being configured to transform the second wave to a third wave corresponding to a kernel multiplication G=KF in Fourier space, where K is a Fourier transform of the kernel k. For example, the second control inputs 142 for the second optical element 118 in FIG. 1B can be adjusted so that the second optical element 118 responds to the second wave 117 to produce the third wave 119. The process further includes 350—refracting optical radiation comprising the third wave with a second refractive optic to provide a fourth wave corresponding to an inverse Fourier transform g of the kernel multiplication KF. For example, the second volumetric metamaterial 120 in FIG. 1B can receive the third wave 119 and transmit the fourth wave 121. The process further includes step 360—detecting optical radiation comprising the fourth wave with a detector array. For example, the detector array 122 in FIG. 1B can receive fourth wave 121 and output a detector signal 123 (e.g., voltage signals indicating the amounts of optical radiation received across the extent of the detector array). As shown by the looped arrow 370, the process elements 310, 320, 330, 340, 350, and 360 can be repeated, e.g., by updating the input vector f and/or the kernel k to iteratively compute a succession of convolutions, for example, to compute convolutions for successive layers of a convolutional neural network algorithm. The electronic subsystem 130 in FIG. 1A or 1B can be programmed to carry out this iteration using the optical subsystem 110 to perform the convolution calculations.

The volumetric metamaterials depicted in FIGS. 1A and 1B (i.e. the volumetric metamaterial 125 in FIG. 1A and the volumetric metamaterials 116 and 120 in FIG. 1B) can be designed and implemented by a symphotic algorithm. Without wishing to be bound by theory, we disclose a generalized version of the symphotic algorithm to magneto-electric, anisotropic media in section B. The symphotic algorithm is reduced to a basis of anisotropic magnetic and electric dipoles in section C.

Generally speaking, the symphotic algorithm provides a way to take a specification of a set of input fields and output fields, which effectively define a multiplex, and based on the desired mapping of input fields to output fields compute the required polarizabilities of a given set of metamaterial elements in order for the metamaterial to scatter the input modes into the output modes. In order to design a metamaterial that implements a Fourier transform, the Fourier transform, which is a continuous operator, is described in the language of a multiplex between one set of modes and another. This is done in Sections D and E, where a method to adapt the symphotic algorithm to design a metamaterial that implements a Fourier transform in one and two dimensions is disclosed. In another approach, described in Section F below, a metamaterial can be designed to volumetrically implement a convolution operator.

Figure 4:
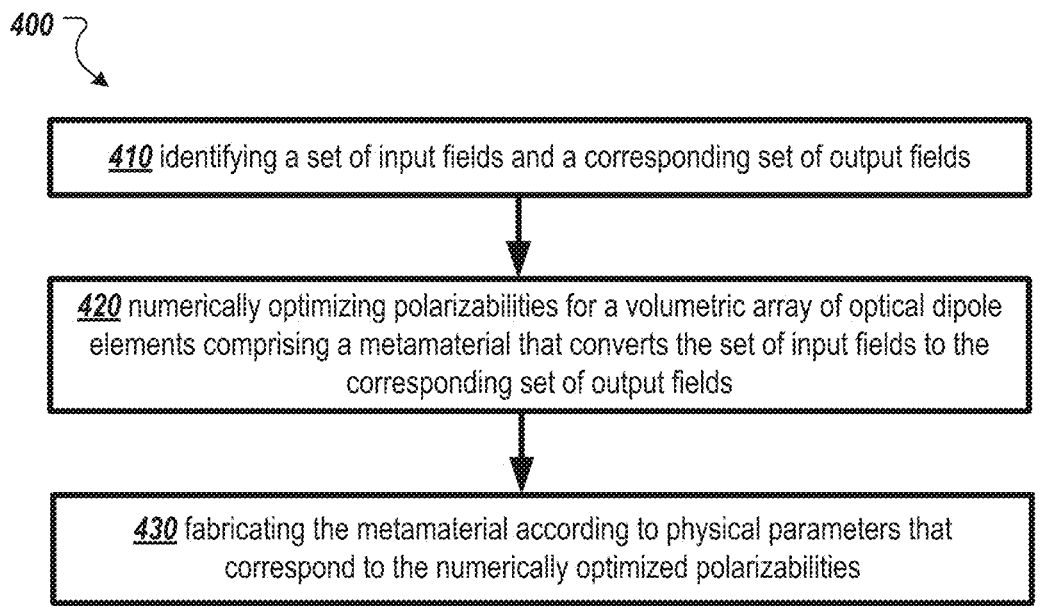
FIG. 4 is a flow diagram for a method of designing and fabricating a volumetric metamaterial.

With reference now to FIG. 4, an illustrative embodiment is depicted as a process flow diagram for a process of designing and fabricating a volumetric metamaterial. The process includes 410—identifying a set of input fields and a corresponding set of output fields. For example, to design a metamaterial that implements a Fourier transformation (or inverse Fourier transformation), the input fields can correspond to eigenfunctions of a Fourier transformation operator (or inverse Fourier transformation operator), and the output fields can correspond to these eigenfunctions multiplied by their respective eigenvalues, as further discussed below in Sections D and E. As another example, to design a metamaterial that implements a convolution, the input fields can be plane waves, and the output fields can correspond to those plane waves multiplied by corresponding Fourier amplitudes of a selected convolution kernel, as further discussed below in Section F. The process further includes 420—numerically optimizing polarizabilities for a volumetric array of optical dipole elements comprising a metamaterial that converts the set of input fields to the corresponding set of output fields. For example, a symphotic algorithm can be used to iteratively solve for polarizabilities that carry out the desired multiplex operation between the set of input fields and the corresponding set of output fields, as further described below in Sections D, E, and F.

The process optionally further includes 430—fabricating the metamaterial according to the physical parameters that correspond to the numerically optimized polarizabilities. To implement the design of the volumetric metamaterial, metamaterial elements can be selected having physical parameters that correspond to the calculated polarizabilities. For example, each metamaterial element can have a range of geometrical parameters (e.g., orientations of each element, length or width or aspect ratio of each element, sizes of gaps within each element) and the prescription for the calculated polarizabilities can be converted into a prescription for the geometrical parameters for a fabricated device. As another example, if the individual metamaterial elements are optical resonators (e.g. dielectric or plasmonic resonators), the polarizabilities at an operating frequency of the device can be shifted by tuning the resonant frequencies of the resonators relative to the operating frequency, or by tuning Q-factors of the resonators; thus, a prescription for the calculated polarizabilities can be converted into a prescription for the resonant frequencies and/or Q-factors for the individual resonators. In one approach, individual metamaterial elements can include pairs of dielectric or metallic pillars or rods separated by a gap and having resonant frequencies and/or Q-factors that are functions of a size of the gap or a filling fraction of a material filling the gap, so the prescription for the calculated polarizabilities can be converted into a prescription for gap sizes or filling fractions of material filling the gaps. In another approach, the individual metamaterial elements are dielectric or plasmonic resonators having resonant frequencies and/or Q-factors that are functions of the length, width, aspect ratio, or other geometrical parameter of the dielectric or plasmonic resonators, so the prescription for the calculated polarizabilities can be converted into a prescription for the geometric parameters of the dielectric or plasmonic resonators.

In one approach, the volumetric metamaterial can be assembled by a 3D printing approach, e.g. by 3D printing a volume composed of two or more different materials having contrasting dielectric constants, where the layout of the two or more different materials (e.g. filling fractions of a first material embedded within a second material) is a function of the calculated polarizabilities. In another approach, the volumetric metamaterial can be assembled by a multilayer nanolithographic approach, by depositing and etching nanoscale features on successive layers of a substrate, and/or by fabricating multiple planar nanoscale structures and then laminating the structures together to form a multilayer structure of greater depth.

B. The Symphotic Algorithm for Anisotropic, Magnetic-Electric Metamaterials

The symphotic algorithm is a variational approach to solving the inverse scattering problem. In this section, slightly different derivation and motivation for a functional are presented, and a model is developed for anisotropic magneto-electric dipoles in free space.

The derivation presented here begins with the formation of a Lorentz scalar, which is a quantity that is naturally invariant to Lorentz transformations by its construction. Maxwell's equations themselves are well known to be stationary paths to an integral of the Lorentz scalar that is simply formed out of a contraction of an electromagnetic field tensor with itself. This statement ultimately amounts to Hamilton's principle, which says that an electromagnetic field will always follow a stationary path with respect to the integral of the Lorentz scalar formed by the self-contraction of the field tensor over all spacetime. In other words, Maxwell's equations are the solutions of $$\delta \int \mathcal{L} \, d^4x = 0 \qquad (1)$$

where the Lagrangian $\mathcal{L}$ is given by $$\mathcal{L} = \frac{-1}{4\mu_0} F_{\mu\nu} F^{\mu\nu} - A_\mu J^\mu. \qquad (2)$$

and the electromagnetic four-tensor F is defined by $$F_{\mu\nu} \partial_\mu A_\nu - \partial_\nu A_\mu. \qquad (3)$$

The variation of the function will be zero when the fields satisfy the Euler-Lagrange equation, $$\partial_\beta \frac{\partial \mathcal{L}}{\partial(\partial_\beta A_\alpha)} - \frac{\partial \mathcal{L}}{\partial A_\alpha} = 0, \qquad (4)$$

which ultimately yields Maxwell's equations.

Instead of forming a Lorentz scalar out of a single field by taking the contraction of the electromagnetic field tensor with itself, a Lorentz scalar may also be formed out of any two sets of fields by taking the inner product of two field tensors representing two different fields. If we allow the Lagrangian to be given by $$\mathcal{L} = \frac{-1}{2\mu_0} F^1_{\alpha\beta} F_2^{\alpha\beta} - (A^1_\alpha J^\alpha_2 + A^2_\alpha J^\alpha_1) \qquad (5)$$

where the superscripts (or subscripts) 1 and 2 distinguish the first and second fields, then taking the variation of the functional with respect to the first field will yield Maxwell's equations for the second field, while taking the variation of the functional with respect to the second field will yield Maxwell's equations for the first field. Applying the Euler-Lagrange equation (4) with respect to the first field to the Lagrangian in equation (5) gives, $$\partial_\beta \frac{\partial \mathcal{L}}{\partial(\partial_\beta A^1_\alpha)} = \frac{-1}{2\mu_0} \partial_\beta \frac{\partial F^1_{\mu\nu}}{\partial(\partial_\beta A^1_\alpha)} F_2^{\mu\nu} = \frac{-1}{\mu_0} \partial_\beta F_2^{\alpha\beta} \qquad (6a)$$

$$\frac{\partial \mathcal{L}}{\partial A^1_\alpha} = -J^\alpha_2 \qquad (6b)$$

and hence, $$\partial_\beta F_2^{\alpha\beta} = \mu_0 J_2^\alpha. \qquad (7)$$

which is Gauss's law and Ampere's law for the second field. Likewise, applying the Euler-Lagrange equation to the second field yields, $$\partial_\beta F_1^{\alpha\beta} = \mu_0 J_1^\alpha. \qquad (8)$$

which is Gauss's law and Ampere's law for the first field.

The Lagrangian formed by the contraction of the two sets of fields can be expanded explicitly in terms of those fields, giving, $$\mathcal{L} = \epsilon_0 E_1 \cdot E_2 - \frac{1}{\mu_0} B_1 \cdot B_2 - (A_1 \cdot J_2 + A_2 \cdot J_1) \qquad (9)$$

with the assumption that the charge density $\Psi$ is zero.

Matter can now be introduced into the system by allowing the currents corresponding to the two fields to be separated into free and bound currents. The free currents will provide distinct source terms for each of the two fields, while the bound currents will be generated by the material that exists in the geometry where both of these fields reside, which is quantified by the electric susceptibility of the medium, $\_e$:

$$J_i \to J_i + \epsilon_0 \partial_t(\chi_e * E_i). \tag{10}$$

where * represents a convolution of the impulse response of the medium with the electromagnetic field, and $\_e$ is a complex symmetric tensor. Inserting equation (10) into equation (9), and applying integration by parts to the functional yields the equivalent Lagrangian, $$\mathcal{L} = \epsilon_0 E_1 \cdot E_2 - \frac{1}{\mu_0} B_1 \cdot B_2 + \epsilon_0 (\partial_t A_1) \cdot (\chi_e * E_2) + \tag{11}$$
$$\epsilon_0 (\partial_t A_2) \cdot (\chi_e * E_1) + P_1 \cdot \partial_t A_2 + P_2 \cdot \partial_t A_1$$

Using the Lorentz gauge relation $E = -\partial_t A - \nabla \phi$, along with the recognition that the scalar potential $\phi=0$ in the Lorentz gauge when the charge density $\Psi$ is zero, the Lagrangian finally becomes $$\mathcal{L} = \epsilon_0 E_1 \cdot E_2 - \frac{1}{\mu_0} B_1 \cdot B_2 - \tag{12}$$
$$\epsilon_0 E_1 \cdot (\chi_e * E_2) - \epsilon_0 E_2 \cdot (\chi_e * E_1) - E_1 \cdot P_2 - E_2 \cdot P_1.$$

The extension of the Lagrangian to magnetic materials is straightforward, and yields $$\mathcal{L} = \epsilon_0 E_1 \cdot E_2 - \frac{1}{\mu_0} B_1 \cdot B_2 - \epsilon_0 E_1 \chi_e E_2 - \tag{13}$$
$$\epsilon_0 E_2 \chi_e E_1 - \mu_0 H_1 \chi_m E_2 - \mu_0 H_2 \chi_m H_1 - E_1 \cdot P_2 - E_2 \cdot P_1.$$

where it was also assumed that the material is non-dispersive, so the convolution between the field and the medium was dropped.

Again, when the variation of the functional in equation (1) with respect to either of the fields is taken, one obtains Maxwell's equations for each field independently, where the first field is distinguished from the second field by the presence of the different source terms $P_1$ and $P_2$. However, if the variation of the functional is taken with respect to the material instead of the fields, then the functional achieves a stationary value (in particular, a maximum) when the fields agree over the support of the polarizable material $\_e$ and $\_m$. Reaching the condition that $E_1=E_2$ on the support of $\_e$ would imply that $E_1=E_2$ in the entire space (by a version of the identity theorem applicable to real, analytic functions). However, if one of the two source terms, for example $P_2$ along with its corresponding fields, is time-reversed such that it is an energy sink rather than a source field, then the solution that $E_1=E_2$ is one that guides the field energy generated by $P_1$ into the energy sink $P_2$.

Setting the variation of the functional in equation (1) with respect to the material equal to zero amounts to applying the Euler-Lagrange equation, $$\partial_\beta \frac{\partial \mathcal{L}}{\partial(\partial_\beta \chi_e)} - \frac{\partial \mathcal{L}}{\partial \chi_e} = 0 \tag{14a}$$

$$\partial_\beta \frac{\partial \mathcal{L}}{\partial(\partial_\beta \chi_m)} - \frac{\partial \mathcal{L}}{\partial \chi_m} = 0. \tag{14b}$$

This gives the condition that, $$\frac{\partial \mathcal{L}}{\partial \chi_e} = -\epsilon_0(E_1 \otimes E_2 + E_2 \otimes E_1) = 0 \tag{15a}$$

$$\frac{\partial \mathcal{L}}{\partial \chi_m} = -\mu_0(H_1 \otimes H_2 + H_2 \otimes H_1) = 0$$

where $\otimes$ is the tensor product. Note that this is a tensor-valued derivative since susceptibilities are tensors in general.

C. Applying the Symphotic Algorithm to the Coupled Dipole Description of Metamaterials Metamaterials are artificially created materials that are assembled by collecting a set of scatterers that are known to be deeply subwavelength in size, and therefore scatter primarily as either point electric or point magnetic dipoles. One method of modeling metamaterials is therefore as a set of coupled dipoles, which interact through a Green's function of the embedding space. In order to apply the symphotic algorithm to the design of a metamaterial device, we allow the susceptibility to be described by a collection of point dipole scatterers, i.e.

$$\chi_e(r) = \sum_i \overline{\alpha}_{e,i} \delta(r - r_i) \tag{16a}$$

$$\chi_m(r) = \sum_i \overline{\alpha}_{m,i} \delta(r - r_i).$$

Setting the variation of the functional with respect to the set of dipoles to zero then yields the condition that, $$\frac{\partial \mathcal{L}}{\partial \overline{\alpha}_{e,i}} = -\epsilon_0(E_1(r_i) \otimes E_2(r_i) + E_2(r_i) \otimes E_1(r_i)) = 0 \tag{17a}$$

$$\frac{\partial \mathcal{L}}{\partial \overline{\alpha}_{m,i}} = -\mu_0(H_1(r_i) \otimes H_2(r_i) + H_2(r_i) \otimes H_1(r_i)) = 0$$

The symphotic algorithm therefore becomes a minimization problem where the derivative of the Lagrangian with respect to the polarizabilities is minimized. This can be done iteratively, since the fields in the medium will themselves depend upon the polarizabilities of the electric and magnetic dipoles.

The iterative method begins by first solving the scattering problem with an initial guess for the polarizabilities of the dipoles. The scattering problem is solved using the coupled dipole method, which yields the total fields at the positions of all the dipoles as solutions to a matrix equation. For any incident field $X_0=\{E_0,H_0\}$, the total field $X=\{E,H\}$ at the N locations of the dipoles $r_i$ can be found by inverting the 6N×6N matrix, $$\sum_j \begin{bmatrix} (\delta_{ij} - G_{ij}\overline{\alpha}_{e,i}) & -Z_0^{-1} F_{ij}\overline{\alpha}_{m,j} \\ Z_0 F_{ij}\overline{\alpha}_{e,j} & (\delta_{ij} - G_{ij}\overline{\alpha}_{m,j}) \end{bmatrix} \begin{bmatrix} E(r_j) \\ H(r_j) \end{bmatrix} = \begin{bmatrix} E_0(r_i) \\ H_0(r_i) \end{bmatrix}. \tag{18}$$

The linear system in equation (18) can be written in a more abbreviated form by defining the matrix on the left as the operator $M(\overline{\alpha}_e, \overline{\alpha}_m)$, such that $X = M(\overline{\alpha}_e, \overline{\alpha}_m)^{-1} X_0$. The Green's function $G_{ij} = G(r_i - r_j)$ is the dyadic Green's function for a double curl equation, which can be found from the scalar Green's function for a scalar wave equation, $$G = \frac{e^{-ikr}}{4\pi r} \tag{19}$$

using $$G = (k^2 I + \nabla \otimes \nabla)G. \tag{20}$$

A magneto-electric Green's tensor F, which represents coupling between electric and magnetic dipoles, is likewise found from the dyadic Green's function by the relation, $$F = \frac{1}{ik} \nabla \times G. \tag{21}$$

In order to proceed with the symphotic algorithm, the fields from the two distinct sources $P_1$ and $P_2$ need to be found. The incident fields from these two sources are given by the integral of the Green's tensors, $$E_{0,i}(r) = \epsilon_0^{-1} \int G(r,r') P_i(r') dV \tag{22a}$$

$$H_{0,i}(r) = e \int F(r,r') P_i(r') dV \tag{22b}$$

where the index i represents any of the source polarizations.

Once the source field is known for each of the fields, the total field at the locations of the dipoles is found by solving the scattering problem in equation (18):

$$\begin{bmatrix} E_i^j \\ H_i^j \end{bmatrix} = M(\overline{\alpha}_e^j, \overline{\alpha}_m^j)^{-1} \begin{bmatrix} E_{0,i} \\ H_{0,i} \end{bmatrix}. \tag{23}$$

Superscripted index j is used to denote the step of the iterative method. Once the fields are known, they can be used to minimize the derivative of the Lagrangian in equation (15) by altering the polarizabilities at the next step according to gradient descent:

$$\overline{\alpha}_{e,i}^{j+1} = \overline{\alpha}_{e,i}^{j} - \gamma_0 \frac{\partial \mathcal{L}}{\partial \overline{\alpha}_{e,i}} \tag{24a}$$

$$\overline{\alpha}_{m,i}^{j+1} = \overline{\alpha}_{m,i}^{j} - \gamma_0 \frac{\partial \mathcal{L}}{\partial \overline{\alpha}_{m,i}} \tag{24b}$$

where $\gamma_0$ is the step size. We note that, since the derivatives of the Lagrangian $\partial \mathcal{L}/\partial \overline{\alpha}_e$ and $\partial \mathcal{L}/\partial \overline{\alpha}_m$ in equation (15) are complex symmetric, following the path of gradient descent will preserve the complex-symmetric property of the polarizability tensors, which is necessary for them to remain passive and with orthogonal principal axes (with respect to an unconjugated inner product).

Once an initial guess is made for the polarizabilities and the initial fields are calculated, the symphotic algorithm proceeds by successively applying equation (23) and equation (24), until the pair of fields $\{E_1, H_1\}$ and $\{E_2, H_2\}$ sufficiently agree over the locations of the dipoles. In order to obtain faster convergence and better stability, one can alternatively implement the accelerated gradient descent method instead of the simple gradient descent algorithm given in equation (24).

In order to implement the symphotic algorithm for multiple input and output fields simultaneously, one simply adds them as separate terms in the Lagrangian. Setting the variation of the final Lagrangian equal to zero with respect to the polarizabilities of the dipoles amounts to summing the contributions of the individual terms corresponding to each mode. The final gradient to be minimized is $$\frac{\partial \mathcal{L}}{\partial \overline{\alpha}_{e,i}} = -\epsilon_0 \sum_n (E_{1n}(r_i) \otimes E_{2n}(r_i) + E_{2n}(r_i) \otimes E_{1n}(r_i)) \tag{25a}$$

$$\frac{\partial \mathcal{L}}{\partial \overline{\alpha}_{m,i}} = -\mu_0 \sum_n (H_{1n}(r_i) \otimes H_{2n}(r_i) + H_{2n}(r_i) \otimes H_{1n}(r_i)).$$

In equation (25a), each input field, with subscript 1, is paired with a particular output, indicated with subscript 2. Each pair of inputs and outputs are indexed with subscript n.

D. Implementing Fourier Transforms with the Symphotic Algorithm in One Dimension This section develops an approach to implementing a Fourier transform with a metamaterial using the symphotic algorithm. In order to implement an operator on the incident field, the input field needs to be expressed as a set of input modes, each of which will be scattered into the required set of output modes by the optical material. For a continuous operator like the Fourier transform, the set of modes required for the decomposition will be infinite. However, the convergence of the operator will be fastest if an orthogonal basis of modes is used. The most natural basis to use is the eigenbasis of the Fourier transform, which will be an orthogonal basis since the Fourier transform operator is a unitary operator.

In this section and the following section, Fourier transform operators in one and two dimensions will be expressed in their eigenbases, and the eigenvalues will be given. An optical medium can implement the desired transform if, for each eigenfunction component of the input field, the symphotic algorithm is used to optimize the material such that the output field is given by the eigenfunction times its eigenvalue.

The Fourier Transform F(k) of an input signal f(x) is defined as $$\mathcal{F}_k\{f(x)\} = F(k) = \frac{1}{\sqrt{2}} \int f(x) e^{ikx} dx \tag{26}$$

Here, we will provide a method to design an optical metamaterial such that, when light is introduced along a particular plane (referred to as the input plane) according to some input signal $f_i(x)$, the light will scatter through the metamaterial structure such that the field at another plane, $f_o(x)$ (referred to as the output plane) will be equal to the Fourier transform F(k) where the spatial coordinate x will be representative of the Fourier space k so that $f_o(x) = F(x)$. Because of the representation k by a physical spatial coordinate, k has units of length, and so the definition of the Fourier transform is re-normalized with a constant $\ell$ that represents an arbitrary length scaling:

$$\mathcal{F}_k\{f(x)\} = F(k) = \frac{1}{\ell\sqrt{2}} \int f(x) e^{ikx/\ell^2} dx \tag{27}$$

This operator is unitary, and the output function F has the same units as the input function F, so the inverse Fourier transform is simply given by the adjoint of equation (27):

$$\mathcal{F}_x^{-1}\{F(k)\} = f(x) = \frac{1}{\ell\sqrt{2}} \int F(k)e^{-ikx/\ell^2} dk. \quad (28)$$

The Fourier transform is a unitary operator that can be represented using its eigenvector decomposition. The eigenfunctions of the one-dimensional Fourier transform are given by Hermite polynomials $H_n(x/W)$, multiplied by a Gaussian $\exp(-(x/\ell)^2/2)$, where $\ell$ is a scaling constant. These eigenfunctions of the Fourier transform are orthogonal, and their inner product is given by $$\int_{-\infty}^{\infty} H_m(x/\ell) H_n(x/\ell) e^{-x^2/\ell^2} dx = \sqrt{\pi}\,\ell\, 2^n n! \delta_{nm}, \quad (29)$$

with an orthonormal basis of functions formed by defining $$\psi_n(x) = \frac{1}{\pi^{1/4}\sqrt{2^n n!\,\ell}} H_n(x/\ell) e^{-x^2/2\ell^2}. \quad (30)$$

The eigenvalues of the Fourier transform are $i^n$, expressible as $$\mathcal{F}_k\{\psi_n(x)\} = i^n \psi_n(k), \quad (31)$$

Since the eigenfunctions are orthogonal, the input signal can be represented as a sum of the eigenfunctions of the Fourier transform, $$f_s(x) = \sum_{n=0}^{\infty} a_n \psi_n(x) \quad (32)$$

where the coefficients $a_n$ are given by $$a_n = \int f_s(x) \psi_n(x) dx. \quad (33)$$

Therefore, the Fourier transform operator for any input $f(x)$ can be rewritten as $$\mathcal{F}_k\{f(x)\} = \sum_{n=0}^{\infty} i^n \psi_n(k) \int f(x) \psi_n(x) dx. \quad (34)$$

The representation of the Fourier transform operator into its eigenbasis shows that, in order to implement a Fourier transform optically, we require that whenever the input field is an eigenmode, $\psi_n(x)$, we require that the output field be $i^n \psi_n(x)$. To implement this for a single mode, the symphotic algorithm can be used, with the input and output fields given by $$E_{0,1}(x,y_1) = \hat{e}\psi_n(x) \quad (35)$$

$$E_{0,2}(x,y_2) = \hat{e}i^n\psi_n(x) \quad (36)$$

where $y_1$ and $y_2$ are the locations of the input and output planes, and $\hat{e}$ is the polarization vector.

The incident input and output fields can be calculated over the rest of the domain by using Love's equivalence theorem to represent the fields as current sources and computing the field throughout the domain using Green's function.

In order for the metamaterial to implement a Fourier transform, the metamaterial should scatter all of the input Gauss-Hermite modes into Gauss-Hermite modes (multiplied by their appropriate eigenvalues) simultaneously. The incident fields for each mode will be given on the boundaries by $$E_{0,1,n}(x,y_1) = \hat{e}\psi_n(x) \quad (37a)$$

$$E_{0,2,n}(x,y_2) = (x,y_2) = \hat{e}i^n\psi_n(x) \quad (37b)$$

which can be used to calculate the fields at the positions of the dipoles using Love's equivalence principle. The total fields $\{E_{i,n}, H_{i,n}\}$ for each mode can then be found by solving the coupled-dipole equations in equation (18), which is then used to compute the gradient of the Lagrangian in equation (25a).

Figure 5:
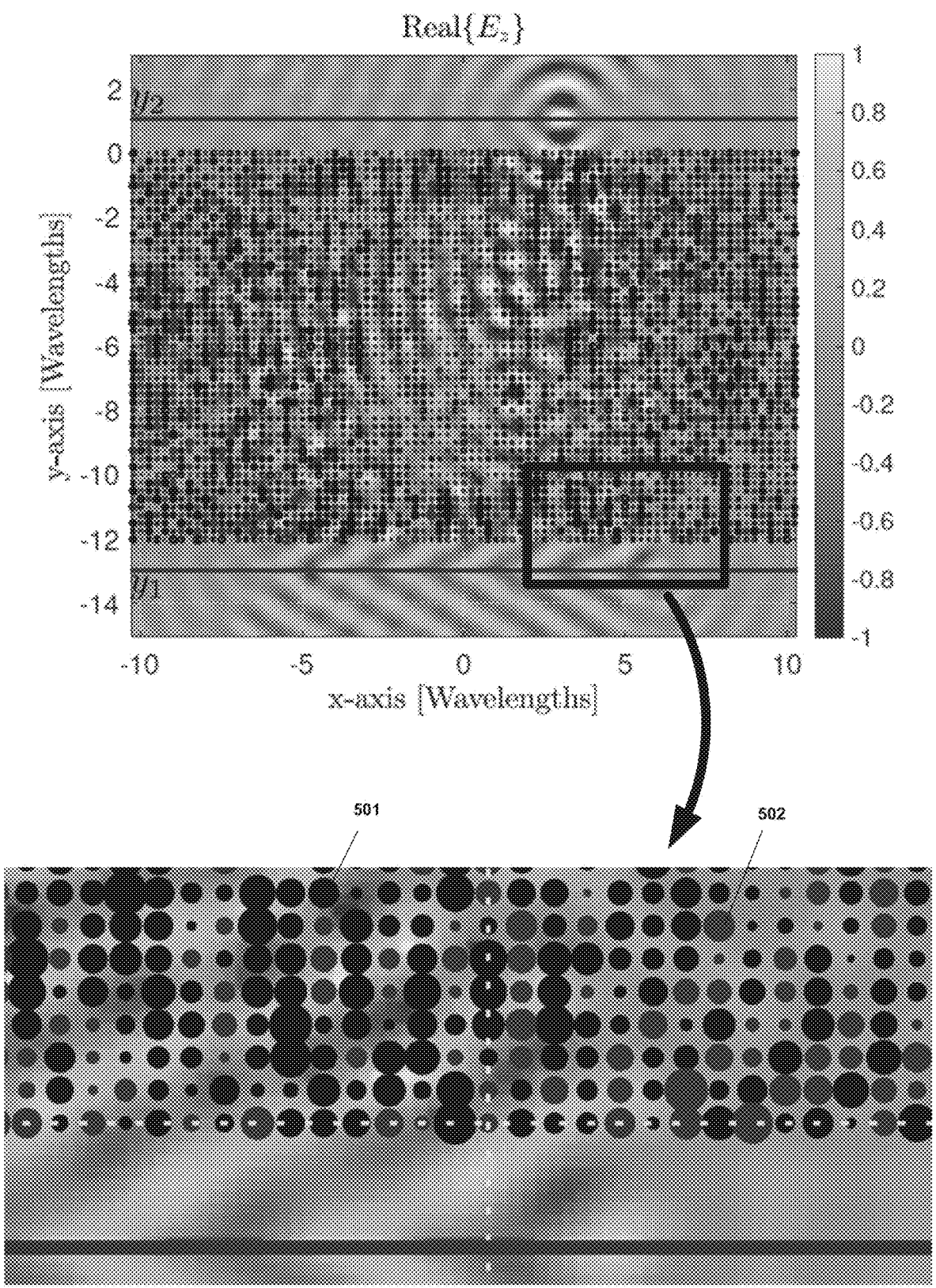
FIG. 5 shows a layout and full-wave simulation of a volumetric metamaterial designed with a symphotic algorithm to perform a Fourier transform.

As an example of designing a metamaterial that implements a Fourier transform with the symphotic algorithm, FIG. 5 shows a volume of metamaterial that is 12λ by 12λ in size, with meta-atoms (i.e. individual metamaterial elements) spaced λ/4 apart. The red/gray lines placed at $y_1$ and $y_2$ on the y-axis show where the input field is generated and output field is measured, respectively. The plot shows the field generated at the output with the source field is a plane wave propagating at 45 degrees relative to the y-axis. As shown in the expanded portion of the figure, the symphotic algorithm provides a prescription for the polarizabilities of the individual metamaterial elements in the array; for each element, the polarizability is indicated by a black dot 501 whose size indicates magnitude of positive polarizability, or by a red/gray dot 502 whose size indicates magnitude of negative polarizability.

Figure 6:
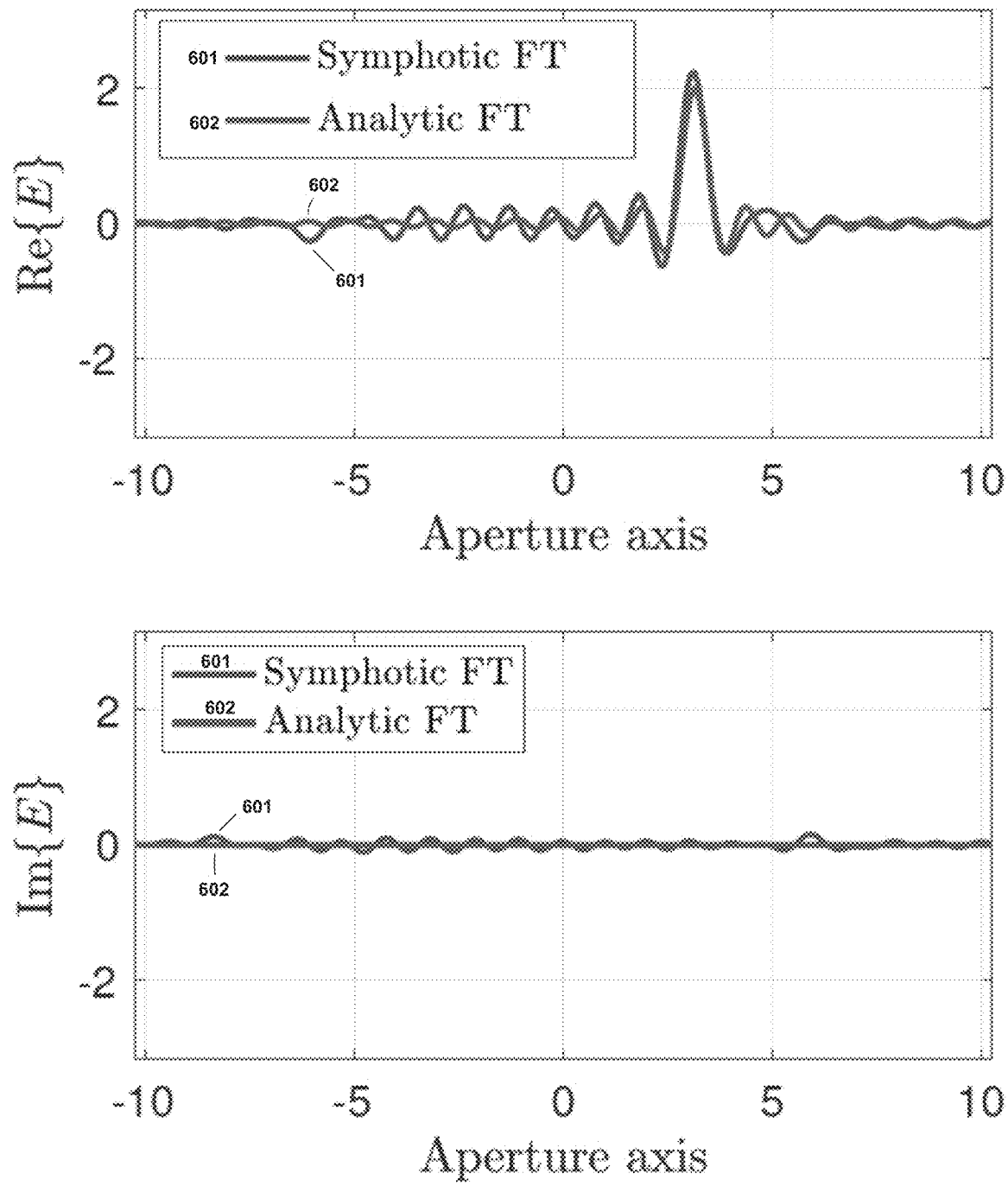
FIG. 6 shows a comparison of the output of the volumetric metamaterial of FIG. 5 for a 45° input plane wave with an analytic solution for the Fourier transform.

A direct comparison of the real and imaginary parts of the field sampled at the output plane at $y_2$ with the analytic solution of the (diffraction band-limited) Fourier transform of the input is shown in FIG. 6, with symphotic results 601 and analytic results 602.

Figure 7:
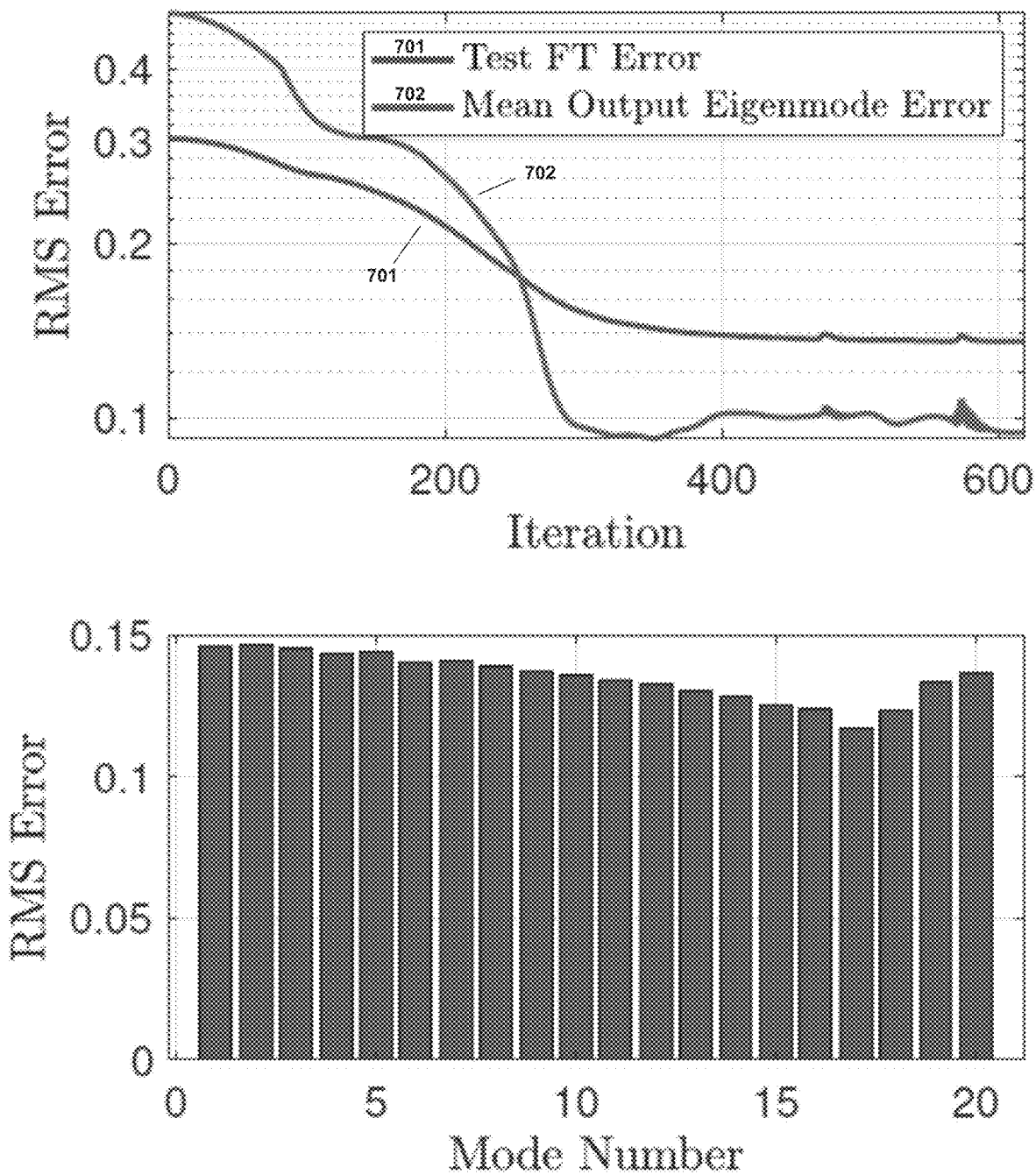
FIG. 7 shows a convergence of the symphotic algorithm for designing a volumetric metamaterial that performs a 1D Fourier transform.

The symphotic algorithm is an iterative method, and as it is repeated with more and more iterations, the performance of the device improves, as shown in FIG. 7, where the root-mean-square (rms) error 701 in the output field from the correct eigenmode output mode due to each input eigenmode is shown. The rms error 702 in the final Fourier transform due to the plane wave test input is also plotted as a function of iteration number.

E. Implementing Fourier Transforms with the Symphotic Algorithm in Two Dimensions When moving to Fourier transforms in two dimensions, there are many different sets of eigenfunctions, two of which are presented here: one when the operator is expressed in polar coordinates, and one when the operator is expressed in cartesian coordinates. When expressed in cartesian coordinates, the eigenfunctions are simply the product of the eigenfunctions of the one dimensional Fourier transform for each of the dimensions:

$$\mathcal{F}_k\{\psi_n(x)\psi_m(y)\} = i^{n+m}\psi_n(k_x)\psi_m(k_y). \quad (38)$$

The two-dimensional device can then implement a Fourier transform by defining the input and output fields using, $$E_{0,1,n,m}(x,y,z_1) = \hat{e}\psi_n(x)\psi_m(y) \quad (39a)$$

$$E_{0,2,n,m}(x,y,z_2) = \hat{e}i^{n+m}\psi_n(x)\psi_m(y) \quad (39b)$$

for each pair of inputs and outputs, indexed by n and m. The remainder of the algorithm then proceeds in the same way as the one dimensional case. The input fields are defined along the xy-plane at location $z=z_1$ and the output fields defined along the xy-plane at $z=z_2$.

Alternatively, the Fourier transform may be expressed in cylindrical coordinates:

$$\mathcal{F}_k\{f(r,\theta)\} = F(k,\theta_k) = \int_0^\infty \int_0^{2\pi} f(r,\theta) e^{ikr\cos(\theta-\theta_k)} r\, dr\, d\theta. \quad (40)$$

In this case, the decomposition of f(r,θ) into a Hermite polynomial basis will not work because the radial coordinate is only defined over positive real numbers, and Hermite polynomials are orthogonal by integration over all real numbers. Instead, the function can be decomposed into a basis of generalized Laguerre polynomials, $L_n^{(v)}(r^2/\ell^2)$, which are orthogonal by integration only over the positive real numbers, $$\int_0^\infty (r/\ell)^{2\nu} L_n^{(\nu)}(r^2/\ell^2) L_m^{(\nu)}(r^2/\ell^2) e^{-r^2/\ell^2} r\, dr = \frac{\ell^2(n+\nu)!}{2(n!)} \delta_{nm}. \quad (41)$$

Therefore, we can introduce the orthonormal set of basis functions of Gauss-Laguerre polynomials, $$\Theta_{n\nu}(r,\theta) = \sqrt{\frac{n!}{\ell^2 \pi (n+\nu)!}} \left(\frac{r}{\ell}\right)^\nu L_n^{(\nu)}(r^2/\ell^2) e^{-r^2/2\ell^2} e^{i\nu\theta}. \quad (42)$$

These obey the orthogonality relation, $$\int_0^\infty \int_0^{2\pi} \Theta_{n\nu}(r,\theta) \Theta_{m\mu}(r,\theta) r\, dr\, d\theta = \delta_{nm}\delta_{\nu\mu}. \quad (43)$$

so the input function can be decomposed into the sum of orthonormal functions, $$f(r,\theta) = \sum_{nm} a_{nm} \Theta_{n\nu}(r,\theta) \quad (44)$$

where the coefficients are given by $$\alpha_{nm} = \int_0^\infty \int_0^{2\pi} f(r,\theta) \Theta_{n\nu}(r,\theta) r\, dr\, d\theta. \quad (45)$$

Inserting one of the $\Theta_{n\nu}(r,\theta)$ basis functions into the Fourier transform in cylindrical coordinates in equation (40), one can show that these are eigenfunctions of the Fourier transform in cylindrical coordinates, with eigenvalue $i^{2n+\nu}$. The two-dimensional device can then implement a Fourier transform by defining the input and output fields using, $$E_{0,1,n,\nu}(r,\theta,z_1) = \hat{e}\Theta_{n\nu}(r,\theta) \quad (46a)$$

$$E_{0,2,n,\nu}(r,\theta,z_2) = \hat{e}i^{2n+\nu}\Theta_{n\nu}(r,\theta), \quad (46b)$$

for each pair of inputs and outputs, indexed by n and ν. The remainder of the algorithm then proceeds in the same way as the one dimensional case. The input fields are defined along the xy-plane at location $z=z_1$ and the output fields defined along the xy-plane at $z=z_2$.

F. Implementing Convolutions with the Symphotic Algorithm

Consider the geometry illustrated in FIG. 8, where a collection of dipoles exists within the symphotic metamaterial, which is designed to scatter the field in a scene plane $E_s$ into an aperture plane in such a way that the field in an aperture plane $E_a$ is the convolution of the field in the scene plane with a convolutional kernel H:

$$E_a(x) = \int H(x-x') E_s(x')\, dx. \quad (47)$$

One can write this in operator notation, $$E_a = \hat{H}E_s. \quad (48)$$

A convolution is most fundamentally an integral operator in Hilbert space, and as such it is an operator with a continuous eigenvalue spectrum and eigenvector basis. The eigenvectors of a convolution operator turn out to be plane waves, i.e.

$$\Lambda_{k_x} e^{-ik_x x} = \hat{H} e^{-ik_x x} \quad (49)$$

where the (complex) eigenvalues $\Lambda_{k_x}$ are given by the Fourier transform of the kernel, $$\Lambda_{k_x} = \int H(x) e^{ik_x x} dx. \quad (50)$$

Let the eigenvectors be represented by $\psi_{k_x} = \exp(-ik_x x)$. Since the convolution operator is Hermitian, the eigenvectors are orthogonal with respect to a conjugated inner product over Hilbert space, i.e., $$\int \psi_{k_x} \psi^*_{k'_x} dx = \delta(k_x - k'_x). \quad (51)$$

The convolution operator $\hat{H}$ can be constructed by a sum over its eigenbasis, $$\hat{H}(x,x') = \int dk_x \Lambda_{k_x} \psi_{k_x}(x) \psi^*_{k_x}(x') \quad (52)$$

which is the convolution theorem. In a discrete basis over $k_x$, this can be alternatively written as, $$\hat{H} = \sum_{k_x} \Delta k_x \psi k_x \otimes \psi k_x. \quad (53)$$

In other words, in order to implement a convolution with a metamaterial, the metamaterial is designed such that each incident wave scatters into the same wave in the forward direction, but with scaled amplitude and phase given by the eigenvalue $\Lambda_{kx}$. The symphotic algorithm as specified in equations (15), (23), and (24) provides a way to map a single input wave into any arbitrary output wave. Therefore, in order to implement a convolution, this method can first be extended to take into account an arbitrary number of input and output waves to cover all of the transverse k-space:

$$\frac{\partial \mathcal{L}}{\partial \alpha_{e,i}} = -\epsilon_0 \sum_{k_x} \left( E_{in}^{k_x}(r_i) \otimes E_{out}^{k_x}(r_i) + E_{out}^{k_x}(r_i) \otimes E_{in}^{k_x}(r_i) \right) \quad (54a)$$

$$\frac{\partial \mathcal{L}}{\partial \alpha_{m,i}} = -\mu_0 \sum_{k_x} \left( H_{in}^{k_x}(r_i) \otimes H_{out}^{k_x}(r_i) + H_{out}^{k_x}(r_i) \otimes H_{in}^{k_x}(r_i) \right) \quad (54b)$$

where the complex conjugate was used to implement the time reversal of the output fields. The incident and output fields are found by solving the scattering problem using the coupled dipole method, $$\begin{bmatrix} E_{in}^{k_x} \\ H_{in}^{k_x} \end{bmatrix} = M(\bar{\alpha}_e, \bar{\alpha}_m)^{-1} \begin{bmatrix} E_{0,in}^{k_x} \\ H_{0,in}^{k_x} \end{bmatrix}. \quad (55a)$$

$$\begin{bmatrix} E_{out}^{k_x} \\ H_{out}^{k_x} \end{bmatrix} = M(\bar{\alpha}_e, \bar{\alpha}_m)^{-1} \begin{bmatrix} E_{0,out}^{k_x} \\ H_{0,out}^{k_x} \end{bmatrix}. \quad (55b)$$

The incident field for the input plane waves are simply given by the plane wave extension of $\psi_{k_x}$, assuming transverse-magnetic modes:

$$E_{0,in}^{k_x} = \hat{z} e^{-i(k_x x + k_y y)} \tag{56a}$$

$$H_{0,in}^{k_x} = \left(\frac{k_y \hat{x}}{Z_0 k} + \frac{k_x \hat{y}}{Z_0 k}\right) e^{-i(k_x x + k_y y)} \tag{56b}$$

where $k_y = \sqrt{k^2 - k_x^2}$.

The incident, output fields will be given by the same basis, but scaled by the required eigenvalue from the convolution operator, $$E_{0,out}^{k_x} = \Delta_{k_x}^* \hat{z} e^{i(k_x x + k_y y)} \tag{57a}$$

$$H_{0,out}^{k_x} = \Delta_{k_x}^* \left(\frac{k_y \hat{x}}{Z_0 k} + \frac{k_x \hat{y}}{Z_0 k}\right) e^{i(k_x x + k_y y)} \tag{57b}$$

where $k_y = \sqrt{k^2 - k_x^2}$.

Unfortunately, since the total field is a linear function of the incident field, and the derivative of the Lagrangian is in turn a linear function of the total field, the Lagrangian is in turn a linear function of the incident field. This means that, while setting the derivative of the Lagrangian to zero will implement the correct phase rotation of the output beams, it cannot properly scale their amplitude with respect to the incident beam. In order to remove energy from the input beam to achieve the correct amplitude for the output beam, we introduce an additional "dump" beam for each incident wavevector. The dump beams are additional output beams which reflect unwanted energy back in the direction of the scene away from the aperture. The incident dump beams subtract the remaining energy from the input beam, and therefore their incident fields will be given by $$E_{0,dump}^{k_x} = e^{i\theta_{k_x}} \sqrt{1 - |\Lambda_{k_x}|^2} \, \hat{z} e^{-i(k_x x - k_y y)} \tag{58a}$$

$$H_{0,dump}^{k_x} = e^{i\theta_{k_x}} \sqrt{1 - |\Lambda_{k_x}|^2} \, \Lambda_{k_x} \left(\frac{k_y \hat{x}}{Z_0 k} + \frac{k_x \hat{y}}{Z_0 k}\right) e^{-i(k_x x - k_y y)} \tag{58b}$$

where $\theta_{k_x}$ is an arbitrary scattering phase that can be left as a free parameter. Adding the dump fields to the Lagrangian gives the final derivative as $$\frac{\partial \mathcal{L}}{\partial \alpha_{e,i}} = -\epsilon_0 \sum_{k_x} \left( E_{in}^{k_x}(r_i) \otimes \left(E_{out}^{k_x}(r_i) + E_{dump}^{k_x}(r_i)\right)^* + \right. \tag{59a}$$

$$\left. \left(E_{out}^{k_x}(r_i) + E_{dump}^{k_x}(r_i)\right) \otimes E_{in}^{k_x}(r_i)\right)$$

$$\frac{\partial \mathcal{L}}{\partial \alpha_{m,i}} = -\mu_0 \sum_{k_x} \left( H_{in}^{k_x}(r_i) \otimes \left(H_{out}^{k_x}(r_i) + H_{dump}^{k_x}(r_i)\right)^* + \right. \tag{59b}$$

$$\left. \left(H_{out}^{k_x}(r_i) + H_{dump}^{k_x}(r_i)\right) \otimes H_{in}^{k_x}(r_i)\right)$$

Figure 9:
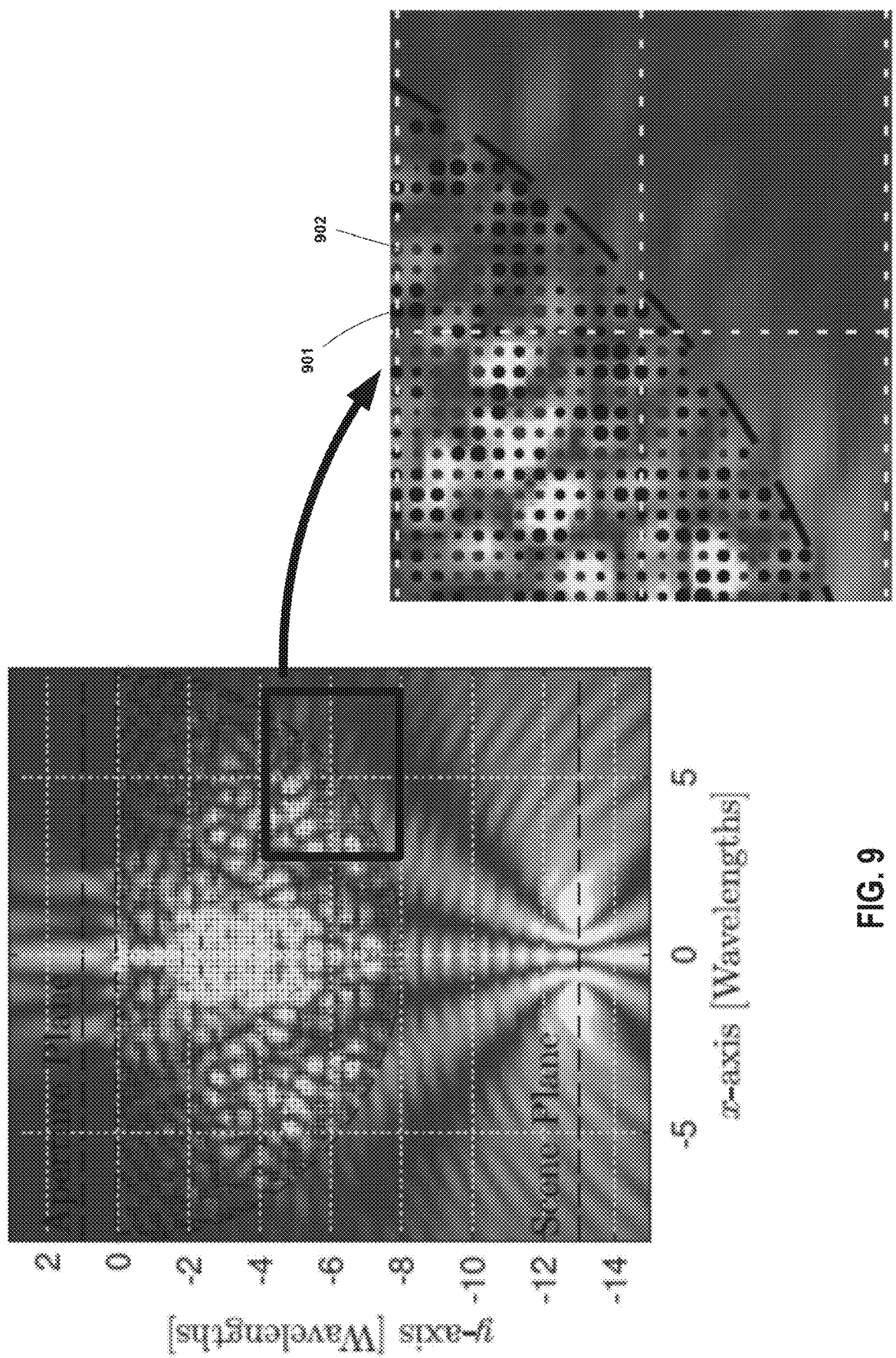
FIG. 9 shows a layout and full-wave simulation of a volumetric metamaterial designed with a symphotic algorithm to perform a kernel convolution.

As an example of a symphotic lens that performs a convolution, consider the geometry shown in FIG. 9. The symphotic lens is placed between a scene plane which contains a source of electromagnetic fields, and an aperture plane where the result of the convolution is measured. In this particular example, the scene plane contains two point sources that are placed two wavelengths apart along the x-axis. The symphotic lens is trained to implement a convolution with a kernel K(x) that is also two point sources spaced two wavelengths apart, i.e.)

$$K(x) = \delta(x-1) + \delta(x+1). \tag{60}$$

The symphotic lens implemented in FIG. 9 is a hemisphere with a radius of $8\lambda$, and a metamaterial element spacing of $\lambda/7$. As shown in the expanded portion of the figure, the symphotic algorithm provides a prescription for the polarizabilities of the individual metamaterial elements in the array; for each element, the polarizability is indicated by a black dot 901 whose size indicates magnitude of positive polarizability, or by a red/gray dot 902 whose size indicates magnitude of negative polarizability.

Figure 10:
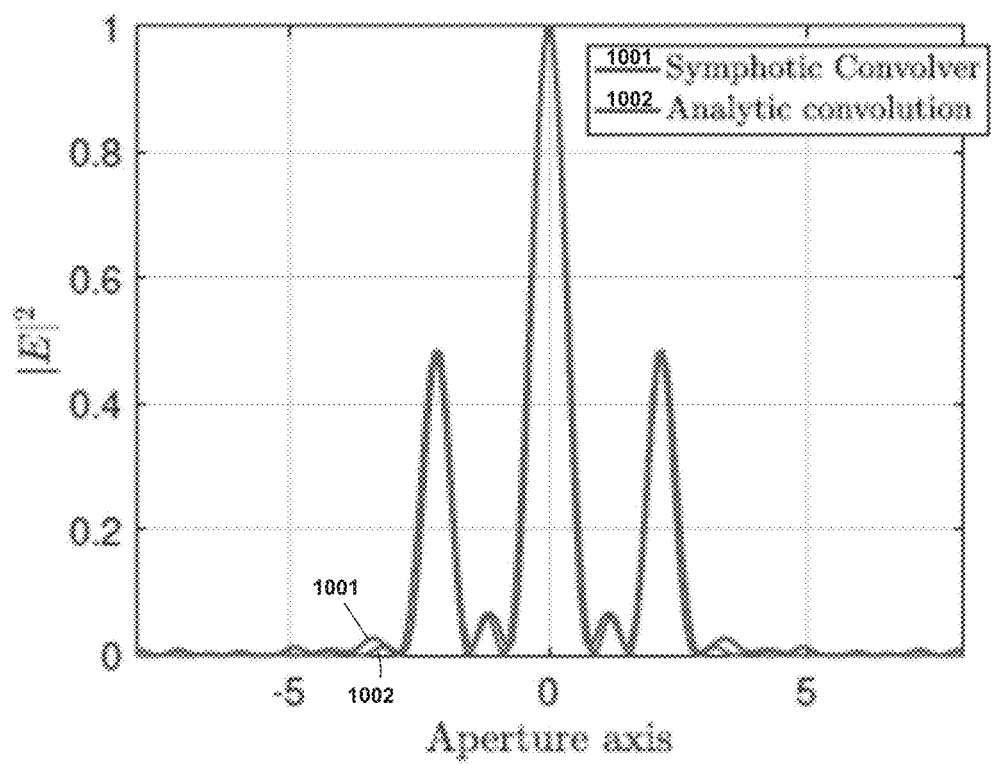
FIG. 10 shows a comparison of the output of the volumetric metamaterial of FIG. 9 with an analytic solution for the kernel convolution.

The output on the aperture plane can be more closely compared with the exact-analytic convolution of the kernel with the object. Since the optics will always be band-limited by the frequency, the result of a band-limited analytic convolution of the object with the kernel is compared with the field in the aperture plane in FIG. 10. The two curves appear to match almost exactly.

Figure 11:
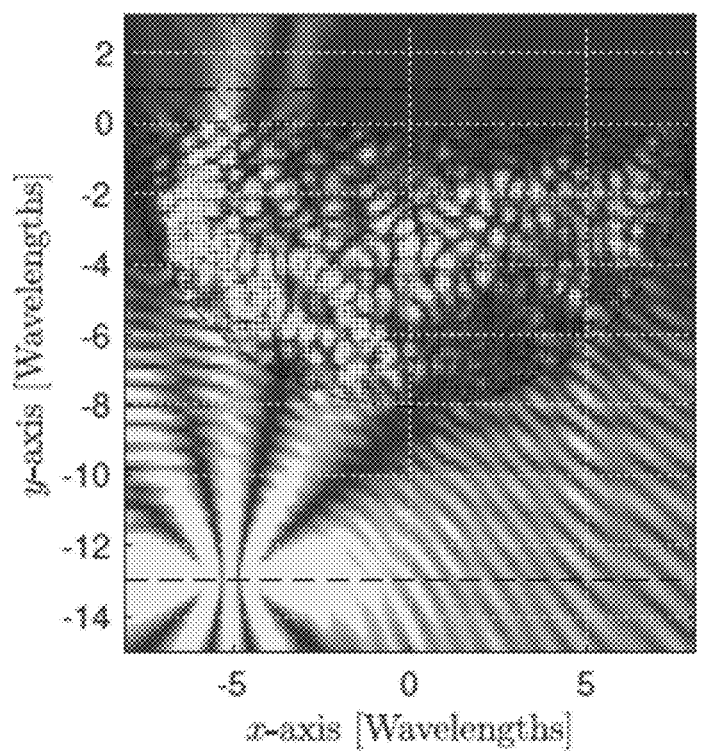
FIGS. 11 and 12 show full-wave simulations of the volumetric metamaterial of FIG. 9 for different positions of the object along the scene plane.
Figure 12:
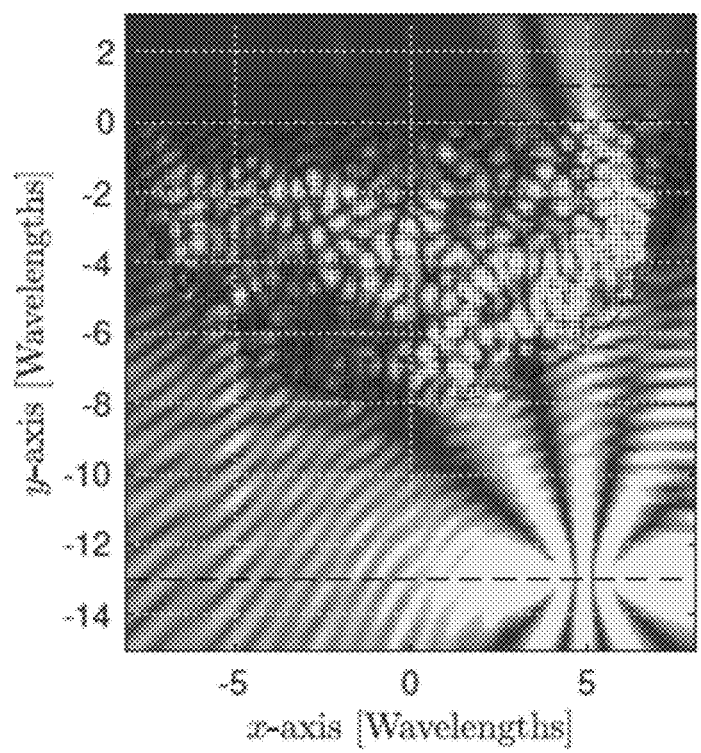

Since the kernel is set to be a matched-filter to the scene, a point of high intensity (i.e. a "hot spot") appears in the aperture plane that corresponds to the location of the object in the scene plane. As the object in the scene is moved along the scene plane, the hot spot in the symphotic lens will track the location of the object in the scene plane by translating the hot spot along the aperture plane an equivalent amount. Two examples of this are shown in FIGS. 11 and 12.

Figure 13:
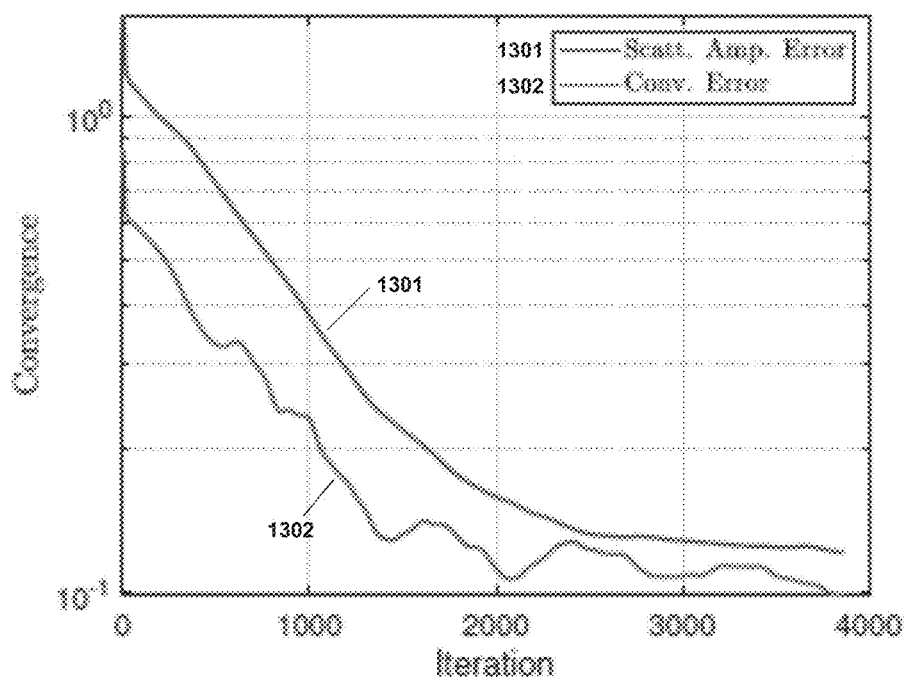
FIG. 13 shows the convergence of the symphotic algorithm for designing a volumetric metamaterial that performs a kernel convolution.

During the training process, the symphotic algorithm attempts to match the scattering phases and amplitudes for each incident plane wave to the required scattering amplitudes and phases by the Fourier transform of the particular kernel of interest. A norm square of the error 1301 of these scattering phases is shown in FIG. 13 as a function of an iteration number of the algorithm, along with a norm square 1302 of an error in the example convolution of two point sources shown in FIG. 9. After several thousand iterations the algorithm converges, and has minimized the error as much as possible given the electrical volume of the symphotic lens and density of metamaterial elements. The scattering amplitude error, which appears to be an upper bound on the convolution error, is 12% in the last iteration. The final mean square error in the test convolution is only 10%.

Although an example electronic subsystem 130 has been depicted in FIGS. 1A-1B, implementations of the electronic subsystem 130 and its functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be at least partially implemented in digital electronic circuitry, or in computer software, firmware, or hardware, including the structures disclosed in this specification and their structural equivalents, or in combinations of one or more of them. Embodiments of the subject matter described in this specification can be at least partially implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be at least partially implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed at least partially by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for optically calculating a convolution of an input vector f with a kernel k, comprising:
   an optical source to generate an optical radiation feed wave;
   an optical metasurface with an array of optical radiation scatterers spaced apart by less than one-half of a wavelength of the optical radiation feed wave to receive the optical radiation feed wave,
      wherein the optical radiation scatterers are adjustable responsive to first control inputs to transmit a first wave corresponding to the input vector f, and
      wherein the first control inputs operate to adjust resonant frequencies of the optical radiation scatterers;
   a first refractive optic positioned to receive the first wave and transmit a second wave corresponding to a Fourier transform F of the input vector f;
   an optical element positioned to receive the second wave and adjustable responsive to second control inputs to transmit a third wave corresponding to a kernel multiplication G=KF in Fourier space, where K is a Fourier transform of the kernel k; and
   a second refractive optic positioned to receive the third wave and transmit a fourth wave corresponding to an inverse Fourier transform g of the kernel multiplication KF to a detector.

2. The system of claim 1, wherein the second refractive optic comprises a volumetric metamaterial.

3. The system of claim 1, wherein the second refractive optic comprises a Fourier lens.

4. The system of claim 1, wherein the optical element comprises a metasurface with an array of optical radiation scatterers spaced apart by substantially less than one-half of a wavelength of the optical radiation, and the second control inputs are control inputs for individually adjusting scattering properties of the optical radiation scatterers.

5. A system for optically calculating a convolution of an input vector f with a kernel k, comprising:
   an optical metasurface to receive an optical radiation feed wave, the first optical metasurface comprising an array of optical radiation scatterers spaced apart by less than one-half of a wavelength of the optical radiation feed wave,
      wherein the optical radiation scatterers are adjustable responsive to first control inputs to transmit a first wave corresponding to the input vector f, and
      wherein the first control inputs operate to adjust Q-factors of the optical radiation scatterers;
   a first refractive optic positioned to receive the first wave and transmit a second wave corresponding to a Fourier transform F of the input vector f;
   an optical element positioned to receive the second wave and adjustable responsive to second control inputs to transmit a third wave corresponding to a kernel multiplication G=KF in Fourier space, where K is a Fourier transform of the kernel k; and
   a second refractive optic positioned to receive the third wave and transmit a fourth wave corresponding to an inverse Fourier transform g of the kernel multiplication KF to a detector.

6. The system of claim 5, wherein the second refractive optic comprises one of a volumetric metamaterial and Fourier lens.

7. The system of claim 5, wherein the optical element comprises a spatial light modulator.

8. The system of claim 5, wherein the second optical element comprises a metasurface with an array of optical radiation scatterers spaced apart by substantially less than one-half of a wavelength of the optical radiation, and the second control inputs are control inputs for individually adjusting scattering properties of the optical radiation scatterers.

9. The system of claim 5, wherein the optical radiation scatterers are voltage-tunable optical radiation scatterers, and the first control inputs are voltage control inputs for the optical radiation scatterers.

10. A system, comprising:
    an optical radiation source;
    a first optical element positioned to:
       receive a feed wave of optical radiation from the optical radiation source, and
       adjust resonant frequencies of a plurality of optical radiation scatterers by modifying an internal property of each radiation scatterer in response to first control inputs to transmit a first wave corresponding to an input vector f, wherein the optical radiation scatterers are spaced apart by less than one-half of a wavelength of the feed wave of the optical radiation source;
    a first refractive optic positioned to receive the first wave and transmit a second wave corresponding to a Fourier transform F of the input vector f;
    a second optical element positioned to receive the second wave and adjust in response to second control inputs to transmit a third wave corresponding to a kernel multiplication G=KF in Fourier space, where K is a Fourier transform of the kernel k; and
    a second refractive optic positioned to:
       receive the third wave, and
       transmit a fourth wave corresponding to an inverse Fourier transform g of the kernel multiplication KF to a detector.

11. The system of claim 10, wherein the first refractive optic comprises a Fourier lens.

12. The system of claim 10, wherein the second refractive optic comprises a Fourier lens.

13. The system of claim 10, wherein the first optical element comprises a spatial light modulator.

14. The system of claim 10, wherein the first optical element comprises an optical metasurface with an array of optical radiation scatterers spaced apart by substantially less than one-half of a wavelength of the optical radiation, and the first control inputs are control inputs for individually adjusting scattering properties of the optical radiation scatterers.

15. The system of claim 14, wherein the optical radiation scatterers are voltage-tunable optical radiation scatterers, and the first control inputs are voltage control inputs for the optical radiation scatterers.

16. The system of claim 15, wherein the second optical element comprises a spatial light modulator.

17. The system of claim 10, wherein the second optical element comprises an optical metasurface with an array of optical radiation scatterers spaced apart by substantially less than one-half of a wavelength of the optical radiation, and the second control inputs are control inputs for individually adjusting scattering properties of the optical radiation scatterers.

18. The system of claim 17, wherein the optical radiation scatterers are voltage-tunable optical radiation scatterers, and the first control inputs are voltage control inputs for the optical radiation scatterers.

* * * * *